United States Patent
Hirano et al.

(10) Patent No.: US 11,388,387 B2
(45) Date of Patent: Jul. 12, 2022

(54) IMAGING SYSTEM AND SYNCHRONIZATION CONTROL METHOD

(71) Applicant: PANASONIC I-PRO SENSING SOLUTIONS CO., LTD., Fukuoka (JP)

(72) Inventors: Tetsushi Hirano, Fukuoka (JP); Yuji Kiniwa, Fukuoka (JP); Haruo Kogane, Fukuoka (JP)

(73) Assignee: PANASONIC I-PRO SENSING SOLUTIONS CO., LTD., Fukuoka (JP)

( * ) Notice: Subject to any disclaimer, the term of this patent is extended or adjusted under 35 U.S.C. 154(b) by 126 days.

(21) Appl. No.: 16/778,150

(22) Filed: Jan. 31, 2020

(65) Prior Publication Data

US 2020/0252601 A1 Aug. 6, 2020

(30) Foreign Application Priority Data

Feb. 4, 2019 (JP) .............................. JP2019-017851

(51) Int. Cl.
H04N 13/296 (2018.01)
H04N 13/239 (2018.01)
(Continued)

(52) U.S. Cl.
CPC ........... H04N 13/296 (2018.05); H04N 5/067 (2013.01); H04N 5/073 (2013.01); H04N 5/0733 (2013.01);
(Continued)

(58) Field of Classification Search
CPC ...... H04N 5/067; H04N 5/073; H04N 5/0733; H04N 7/52; H04N 7/54; H04N 7/56
See application file for complete search history.

(56) References Cited

U.S. PATENT DOCUMENTS 6,317,166 B1 * 11/2001 McCutchen ............. H04N 5/04
348/218.1
10,264,236 B2 4/2019 Kiniwa et al.
(Continued)

FOREIGN PATENT DOCUMENTS

JP 2010-068992 A 4/2010

OTHER PUBLICATIONS

U.S. Appl. No. 16/745,832 to Tatsuya Tamaru et al., filed Jan. 17, 2020.

*Primary Examiner* — David N Werner
(74) *Attorney, Agent, or Firm* — Greenblum & Bernstein P.L.C.

(57) ABSTRACT

An imaging system includes first and second light source devices configured to irradiate a subject with lights having different wavelength bands, first and second imaging devices configured to image the subject, and first and second video processing devices configured to process an imaged video of the subject imaged by either of the corresponding imaging devices and to output the processed video to an output unit. The first and second light source devices alternately perform lighting in synchronization with a frame period of the imaged video or an integer multiple thereof based on a genlock signal. The first imaging device performs imaging in synchronization with the lighting of each of the first and second light source devices. The second imaging device performs imaging in synchronization with the lighting of each of the first and second light source devices.

10 Claims, 13 Drawing Sheets

(51) Int. Cl.
*H04N 13/254* (2018.01)
*H04N 5/067* (2006.01)
*H04N 5/073* (2006.01)
*H04N 7/56* (2006.01)
*H04N 7/54* (2006.01)
*H04N 7/52* (2011.01)

(52) U.S. Cl.
CPC .............. *H04N 7/52* (2013.01); *H04N 7/54* (2013.01); *H04N 7/56* (2013.01); *H04N 13/239* (2018.05); *H04N 13/254* (2018.05)

(56) References Cited

U.S. PATENT DOCUMENTS

| | | | |
|---|---|---|---|
| 2006/0158461 A1* | 7/2006 | Reese | G06T 1/20 345/620 |
| 2006/0176402 A1* | 8/2006 | Hara | H04N 5/073 348/E5.014 |
| 2010/0069713 A1 | 3/2010 | Endo et al. | |
| 2010/0302376 A1* | 12/2010 | Boulanger | G06K 9/34 348/164 |
| 2012/0062690 A1* | 3/2012 | Apostolopoulos | H04N 7/147 348/14.12 |
| 2013/0095920 A1* | 4/2013 | Patiejunas | G06T 17/20 463/31 |
| 2013/0321593 A1* | 12/2013 | Kirk | H04N 13/243 348/51 |
| 2014/0085419 A1* | 3/2014 | Yoshizawa | H04N 13/296 348/43 |
| 2014/0192158 A1* | 7/2014 | Whyte | H04N 13/20 348/46 |
| 2014/0307047 A1* | 10/2014 | Kirk | G06F 3/0659 348/42 |
| 2014/0307952 A1* | 10/2014 | Sweeney | G06T 7/194 382/154 |
| 2014/0307953 A1* | 10/2014 | Kirk | B29C 64/386 382/154 |
| 2015/0029396 A1* | 1/2015 | Scurrell | H04N 5/0733 348/515 |
| 2015/0229915 A1* | 8/2015 | Kirk | H04N 5/33 348/51 |
| 2015/0289338 A1* | 10/2015 | Hochman | H04N 9/12 315/153 |
| 2016/0182889 A1* | 6/2016 | Olmstead | G01B 11/2513 348/47 |
| 2016/0218820 A1* | 7/2016 | Scurrell | H04N 5/23206 |
| 2019/0037201 A1 | 1/2019 | Serizawa et al. | |
| 2019/0037208 A1 | 1/2019 | Kobayashi et al. | |
| 2019/0037209 A1 | 1/2019 | Kobayashi et al. | |

* cited by examiner

IMAGING SYSTEM AND SYNCHRONIZATION CONTROL METHOD

BACKGROUND OF THE INVENTION

1. Field of the Invention

The present disclosure relates to an imaging system and a synchronization control method that control synchronization of operation of each of a plurality of imaging devices.

2. Description of the Related Art

In a microscopic surgery performed while observing a fine surgical target site (for example, an affected part in a subject) using a surgical microscope, or an endoscopic surgery performed while observing a surgical target site using an endoscope, an observation video (for example, a visible video or a fluorescent video in which fluorescence excited by IR excitation light is imaged) of the surgical target site is imaged and displayed on a monitor. By displaying the observation video on the monitor, a doctor or the like can confirm a situation of the surgical target site in detail, and can grasp the situation of the surgical target site in real time.

JP-A-2010-068992 discloses an electronic endoscope system in which time required to read out an imaging signal from all pixels of a CMOS sensor (one frame period, for example, 1/30 seconds) is set, and in a first imaging mode, normal light and special light are alternately switched every frame period, exposure is performed in a first half frame period, and the imaging signal is read out in a latter half frame period. Thereby, a normal light image and a special light image are alternately obtained every frame period. In a second imaging mode, the normal light and the special light are alternately switched every two frame periods, the exposure is performed in a first one frame period, and the imaging signal is read out in a latter one frame period. Thereby, the normal light image and the special light image are alternately obtained every two frame periods.

During a medical surgery such as the microscopic surgery or the endoscopic surgery described above, in order to be able to determine a clear situation of the surgical target site where the surgery or a treatment is performed (for example, a site such as an affected part where a fluorescent agent administered in advance to a subject by injection or the like before the surgery is accumulated), an output video having good visibility from an imaging system for imaging an observation video is desired to be displayed. In particular, a three-dimensional output video (a 3D video) of the surgical target site is desired to be displayed so that a doctor or the like can grasp a detailed situation of the surgical target site. When a left eye video and a right eye video are obtained by using a plurality of imaging devices for imaging of the 3D video, operation of each of the plurality of imaging devices is required to be synchronized in order to accurately image the surgical target site in a left and right direction. Since a plurality of types of light source devices may be used to brighten a surgical field or to image the fluorescent video described above, the plurality of imaging devices and the plurality of light source devices are required to operate in synchronization at a predetermined timing. However, JP-A-2010-068992 does not consider a suggestion regarding such synchronization control.

SUMMARY OF THE INVENTION

The present disclosure has been devised in view of the above-described circumstances in related art, and an object thereof is to provide an imaging system and a synchronization control method that enable a plurality of light source devices and a plurality of imaging devices to operate in synchronization with each other at a predetermined timing, and support output of a three-dimensional video having good image quality during a medical action such as a microscopic surgery or an endoscopic surgery.

The present disclosure provides an imaging system including: first and second light source devices configured to irradiate a subject with light having different wavelength bands; first and second imaging devices configured to image the subject; and first and second video processing devices provided corresponding to the first and second imaging devices, and configured to process an imaged video of the subject imaged by either of the corresponding imaging devices and to output the processed video to an output unit, wherein the first and second light source devices alternately perform lighting in synchronization with a frame period of the imaged video or an integer multiple thereof based on a genlock signal. The first imaging device performs imaging in synchronization with the lighting of each of the first and second light source devices. The second imaging device performs imaging in synchronization with the lighting of each of the first and second light source devices.

In addition, the present disclosure provides a synchronization control method in an imaging system, the imaging system including: first and second light source devices configured to irradiate a subject with light having different wavelength bands; first and second imaging devices configured to image the subject; and first and second video processing devices provided corresponding to the first and second imaging devices, and configured to process an imaged video of the subject imaged by either of the corresponding imaging devices and to output the processed video to an output unit. The first and second light source devices alternately perform lighting in synchronization with a frame period of the imaged video or an integer multiple thereof based on a genlock signal. The first imaging device performs imaging in synchronization with the lighting of each of the first and second light source devices. The second imaging device performs imaging in synchronization with the lighting of each of the first and second light source devices.

According to the present disclosure, a plurality of light source devices and a plurality of imaging devices can be operated in synchronization with each other at a predetermined timing so as to support output of a three-dimensional video having good image quality during a medical action such as a microscopic surgery or an endoscopic surgery.

DESCRIPTION OF EMBODIMENTS

Hereinafter, embodiments of configurations and operation of an imaging system and a synchronization control method according to the present disclosure will be described in detail with reference to the drawings. However, unnecessarily detailed description may be omitted. For example, a detailed description of a well-known matter or a repeated description of substantially the same configuration may be omitted. This is to avoid unnecessary redundancy in the following description and to facilitate understanding of those skilled in the art. The accompanying drawings and the following description are provided for enabling those skilled in the art to fully understand the present disclosure, and are not intended to limit the subject matter recited in the claims.

In the following embodiments, a medical camera system used during a medical surgery such as a microscopic surgery or an endoscopic surgery will be described as an example of an imaging system according to the present disclosure. However, the imaging system is not limited to the example of the medical camera system.

First Embodiment

Figure 1:
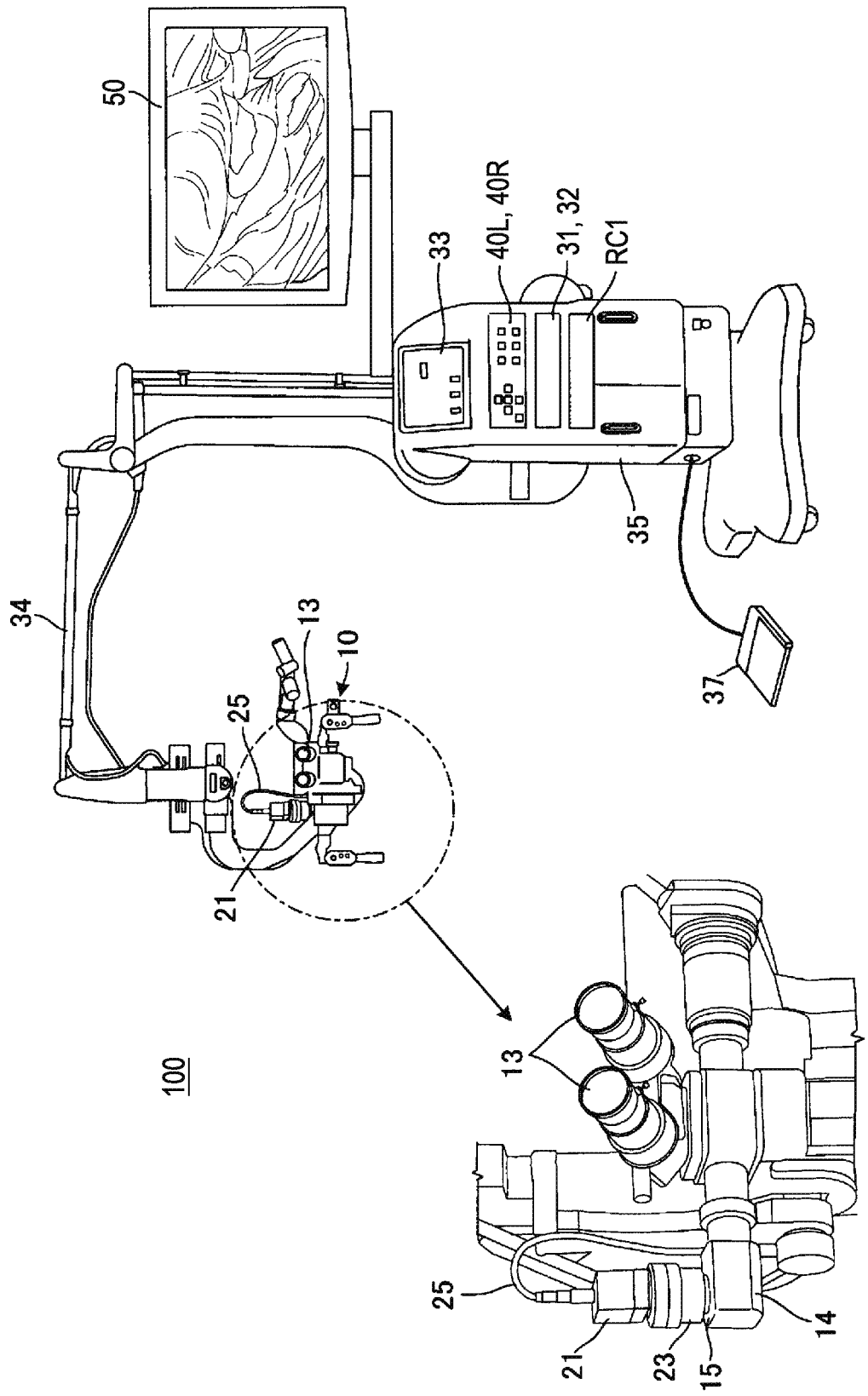
FIG. 1 is a view showing an external appearance example of a medical camera system in which a surgical microscope is used.

In a first embodiment, a medical camera system 100 used when a medical action using a surgical microscope is performed will be described as an example. FIG. 1 is a view showing an external appearance example of the medical camera system 100 in which the surgical microscope is used. The medical camera system 100 includes a surgical microscope 10 as an example of a medical optical instrument, a visible light source device 31, an infrared ray (IR) light source device 32, a camera head 21 as an example of an imaging device, camera control units (CCUs) 40L, 40R as examples of a video processing device, and an output unit 50. The camera head 21 and the CCUs 40L, 40R are connected via a signal cable 25. The camera head 21 and the CCUs 40L, 40R may constitute an imaging device.

The surgical microscope 10 is, for example, a binocular microscope, and includes an objective lens, an observation optical system (not shown) provided so as to correspond to left and right eyes of an observer such as a doctor, eyepiece portions 13, a camera imaging optical system 14 and a camera mounting portion 15. The observation optical system includes a pair of zoom optical systems (not shown), a pair of imaging lenses (not shown) and a pair of eyepiece lenses (not shown) so as to respectively correspond to the left and right eyes of the observer. The pair of zoom optical systems, the pair of imaging lenses and the pair of eyepiece lenses are arranged symmetrically with respect to an optical axis of the objective lens. Light from a subject SUB enters the objective lens, and then left and right observation images having a parallax obtained via the pair of zoom optical systems, the pair of imaging lenses, the pair of eyepiece lenses, an optical system (not shown) and a beam splitter (not shown) are guided to the eyepiece portions 13. By observing the eyepiece portions 13 with both eyes, the observer can visually recognize a state of an observation target site of the subject SUB in a three-dimensional manner.

Here, the light from the subject SUB described above is reflected light obtained by reflecting white light (for example, red/green/blue (RGB) visible light) emitted from the visible light source device 31 by the observation target site with respect to a fluorescent agent (a fluorescent substance) such as indocyanine green (ICG) accumulated at the observation target site in the subject SUB, or is fluorescence generated as a result of excitation of IR excitation light by irradiating the fluorescent agent with the IR excitation light emitted from the IR light source device 32. In the surgical microscope 10, for example, it is preferable that band cut filters (BCF) for blocking transmission of the IR excitation light are respectively formed between the objective lenses and the pair of zoom optical systems in order not to deteriorate image quality of a fluorescent image based on fluorescence imaging.

In a microscopic surgery or an endoscopic surgery, the ICG serving as a fluorescent agent is administered to a body of the subject SUB in advance by injection or the like before irradiation with the IR excitation light in order to determine a situation of a lymph node of the observation target site (for example, an affected part in the subject SUB) by a doctor or the like. Thereby, the ICG is accumulated in the affected part serving as a subject. The ICG emits fluorescence whose light is on a higher wavelength side (for example, 860 nm) when excited by the IR excitation light. A wavelength of the IR excitation light is, for example, 690 nm to 820 nm. When the light generated by the fluorescent emission (that is, the fluorescence) is imaged, the situation of the affected part can be determined in detail.

The camera imaging optical system 14 includes, for example, an optical system (not shown), a beam splitter (not shown) and a mirror (not shown). The camera imaging optical system 14 deflects and separates light passing through the observation optical system by the beam splitter, reflects the light by the mirror, and guides the light to the camera mounting portion 15.

In FIG. 1, the surgical microscope 10 includes the eyepiece portions 13 at an upper portion of a microscope main body, a box body of the camera imaging optical system 14 extending laterally from base end portions of the eyepiece portions 13, and the camera mounting portion 15. The camera mounting portion 15 is opened upward and is formed such that an imaging optical system 23 of the camera head 21 can be mounted. The imaging optical system 23 is attachable to and detachable from a main body of the camera head 21 and is replaceable, and an imaging optical system having different optical characteristics can be used as required.

The medical camera system 100 includes the visible light source device 31 and the IR light source device 32 that illuminate the subject SUB, a recorder RC1 that records data of an observation video imaged by the camera head 21, an operation unit 33 for operating the medical camera system 100, and a foot switch 37 that inputs an operation by a foot of the observer. The operation unit 33, the CCUs 40L, 40R, the visible light source device 31, the IR light source device 32 and the recorder RC1 are housed in a control unit box body 35. The output unit 50 (for example, a display such as a liquid crystal display device) is arranged in vicinity of the control unit box body 35. The surgical microscope 10 is attached to a displaceable support arm 34 and is connected to the control unit box body 35 via the support arm 34.

Figure 2:
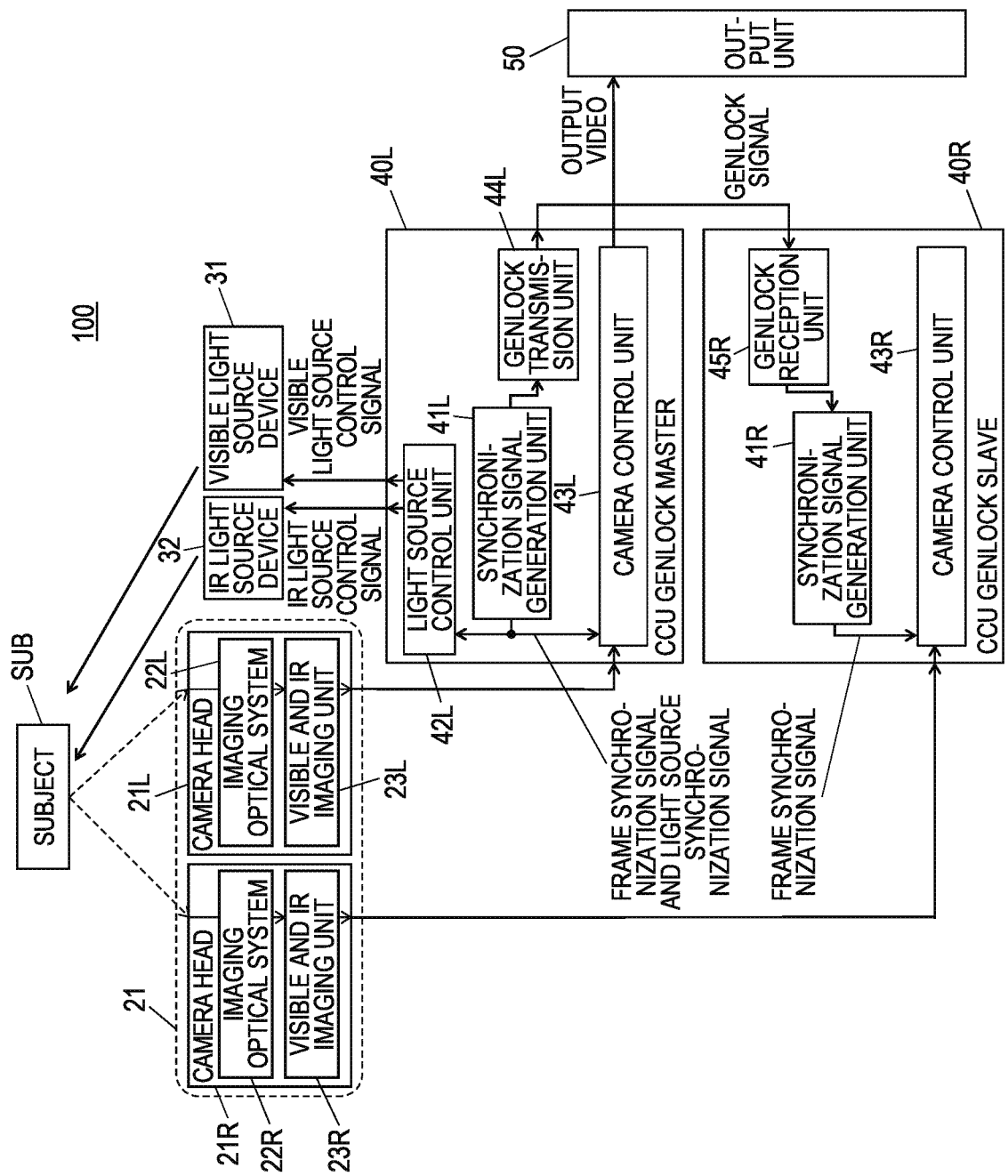
FIG. 2 is a block diagram showing a system configuration example of the medical camera system according to a first embodiment.

FIG. 2 is a block diagram showing a system configuration example of the medical camera system 100 according to the first embodiment. The medical camera system 100 shown in FIG. 2 includes the visible light source device 31, the IR light source device 32, the camera head 21, the CCUs 40L, 40R, and the output unit 50. The camera head 21 and the CCUs 40L, 40R may be configured as an integrated device, and the same applies to the following embodiments.

During the medical action (for example, the surgery) using the surgical microscope, for example, at a timing when a signal component of a visible light source control signal WHC is high in synchronization with the visible light source control signal WHC (see FIG. 4) transmitted from the CCU 40L serving as a genlock master (described below), the visible light source device 31 (an aspect of a first light source device) irradiates the subject SUB with the white light (the visible light) for brightening a surgical field. The visible light source control signal WHC is a control signal for causing the visible light source device 31 to emit the white light (the visible light), is transmitted every "1/60" seconds when a frame rate of an imaged video imaged by the camera head 21 (specifically, each of camera heads 21L, 21R) is, for example, 60 fps, and has a period the same as that of a frame synchronization signal FR1 of the imaged video. The frame synchronization signal FR1 is a control signal for obtaining an imaged image of one frame constituting the imaged video, and similarly is "1/60" seconds when the frame rate of the imaged video is, for example, 60 fps. In the first embodiment, the CCU 40R may function as the genlock master, and in this case, the visible light source control signal WHC is transmitted from the CCU 40R to the visible light source device 31.

During the medical action (for example, the surgery) using the surgical microscope, for example, at a timing when a signal component of an IR light source control signal RC is high in synchronization with the IR light source control signal IRC (see FIG. 4) transmitted from the CCU 40L serving as the genlock master (described below), the IR light source device 32 (an aspect of a second light source device) irradiates with the IR excitation light for causing the affected part of the subject SUB where the fluorescent agent is accumulated to emit the fluorescence. The IR light source control signal IRC is a control signal for causing the IR light source device 32 to emit the IR excitation light, is transmitted every "1/60" seconds when the frame rate of the imaged video imaged by the camera head 21 (specifically, each of the camera heads 21L, 21R) is, for example, 60 fps, and has a period the same as that of the frame synchronization signal FR1 of the imaged video.

The camera head 21 includes the camera head 21L and the camera head 21R. The camera heads 21L, 21R have a similar configuration.

The camera head 21L (an aspect of a first imaging device) includes an imaging optical system 22L and a visible and/or IR imaging unit 23L. The imaging optical system 22L receives and collects reflected light of the subject SUB in response to the irradiation of the white light or the IR excitation light, and forms a subject image by the light on the visible and/or IR imaging unit 23L. The visible and/or IR imaging unit 23L includes a spectral prism that disperses the subject image formed by the imaging optical system 22L into light in each frequency band of RGB and IR, and an image sensor (see FIG. 3) that images each subject image of the light in each wavelength band of RGB and IR. The visible and/or IR imaging unit 23L images the subject image formed by the imaging optical system 22L and reads the imaged image (video) in synchronization with a timing defined by the frame synchronization signal FR1 (described below) transmitted from the corresponding CCU 40L.

Figure 3:
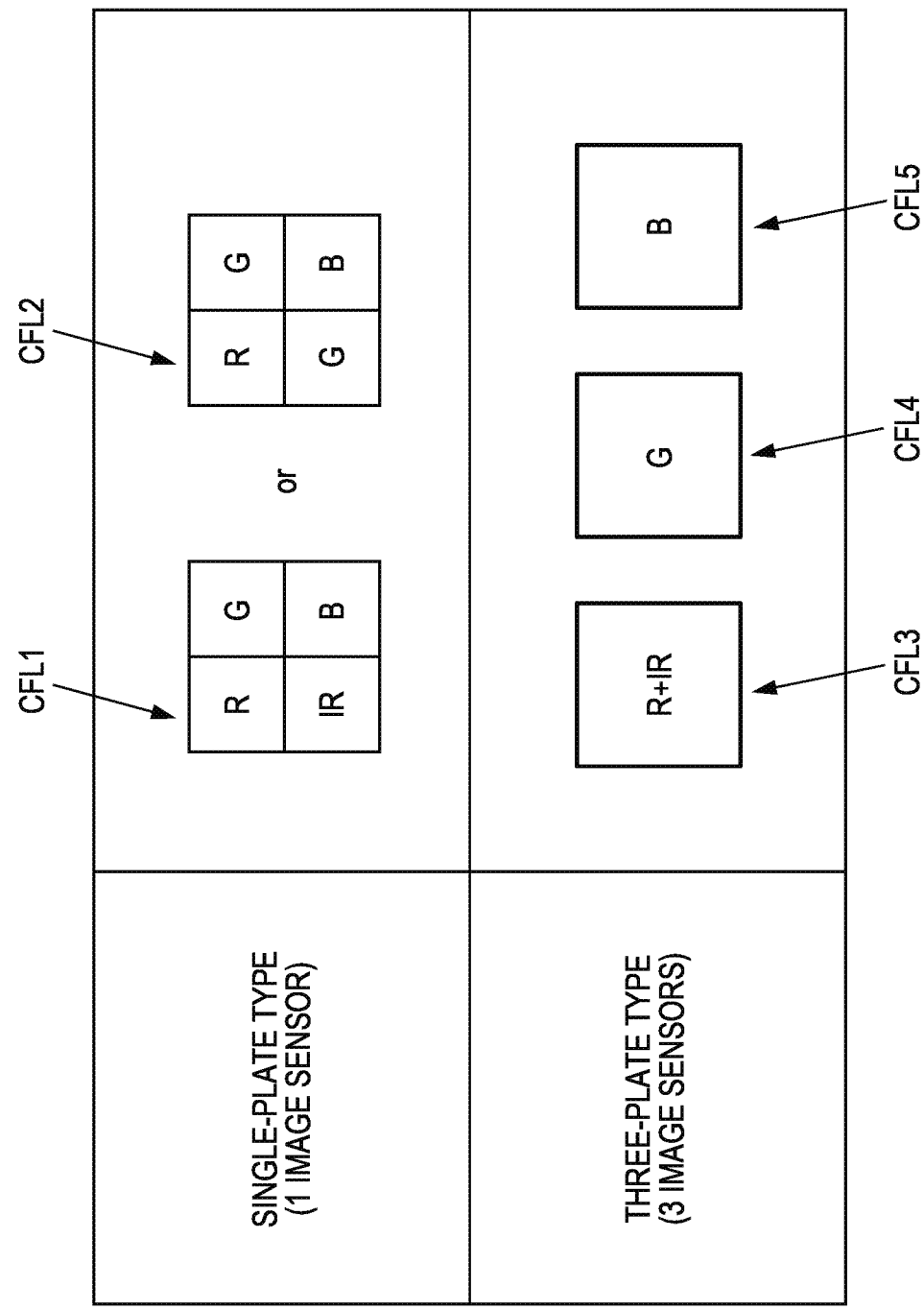
FIG. 3 is an explanatory diagram of types of image sensors constituting a visible and/or IR imaging unit.

Here, a structure of the image sensor in each of visible and/or IR imaging units 23L, 23R of the camera heads 21L, 21R will be described with reference to FIG. 3. FIG. 3 is an explanatory diagram of types of image sensors constituting the visible and/or IR imaging units 23L, 23R.

When the image sensor is a single-plate type, on a front surface of an imaging surface of the image sensor (that is, on an imaging optical systems 22L and 22R side), a color filter 22CFL1 configured to correspond to four pixels of red (R), green (G), blue (B) and IR, or a color filter 22CFL2 configured to correspond to four pixels of red (R), green (G), blue (B) and green (G) is arranged in a Bayer array. In the color filter 22CFL1, red (R) transmits light having a red wavelength, green (G) transmits light having a green wavelength, blue (B) transmits light having a blue wavelength, and IR transmits light having an IR wavelength. Similarly, in the color filter 22CFL2, red (R) transmits the light having the red wavelength, green (G) transmits the light having the green wavelength and the light having the IR wavelength, and blue (B) transmits the light having the blue wavelength. That is, in the color filter 22CFL2, a green (G) color filter having sensitivity in an IR region is used. Since red (R) and blue (B) color filters also have sensitivity in the IR region, as the color filter 22CFL2, the red (R) and blue (B) color filters may be used instead of the green (G) color filter.

The image sensor may be of a three-plate type (see FIG. 3). Specifically, the image sensor may include an image sensor using a color filter CFL3 that transmits light having a red (R) wavelength having sensitivity in the IR region, an image sensor using a color filter CFL4 that transmits light having a green (G) wavelength, and an image sensor using a color filter CFL5 that transmits light having a blue (B) wavelength. The image sensor is a solid-state image sensor such as a charged coupled device (CCD) or a complementary metal oxide semiconductor (CMOS), which is formed into a square, for example.

The camera head 21R (an aspect of a second imaging device) includes an imaging optical system 22R and the visible and/or IR imaging unit 23R. The imaging optical system 22R receives and collects reflected light of the subject SUB in response to the irradiation of the white light or the IR excitation light, and forms a subject image by the light on the visible and/or IR imaging unit 23R. The visible and/or IR imaging unit 23R includes a spectral prism that disperses the subject image formed by the imaging optical system 22R into light in each frequency band of RGB and IR, and an image sensor (see FIG. 3) that images each subject image of the light in each wavelength band of RGB and R. The visible and/or IR imaging unit 23R images the subject image formed by the imaging optical system 22R and reads the imaged image (video) in synchronization with a timing defined by a frame synchronization signal FR2 (described below) transmitted from the corresponding CCU 40R.

The CCU 40L (an aspect of a first video processing device) inputs data of the imaged video imaged by the camera head 21L, performs various video processing on the data of the imaged video, and generates a left eye output video for forming a 3D video that can be viewed in a three-dimensional manner in the output unit 50. The CCU 40L outputs data of the generated left eye output video to the output unit 50. The CCU40L includes a synchronization signal generation unit 41L, a light source control unit 42L, a camera control unit 43L and a genlock transmission unit 44L.

The synchronization signal generation unit 41L, the light source control unit 42L and the camera control unit 43L include, for example, a processor such as a central processing unit (CPU), a digital signal processor (DSP) or a field programmable gate array (FPGA). The processor executes various processing according to a predetermined program stored in a memory (not shown in FIG. 2) built in the CCU 40L, for example. The processor uses a random access memory (RAM) and a read only memory (ROM) as the memory during operation, and temporarily stores data or information generated or obtained by the processor in the RAM described above. The ROM stores a program for executing functions of the processor and various setting data. In addition, the RAM stores various data generated during processing of the processor.

In the first embodiment, the CCU 40L serves as the genlock master. The genlock master generates a genlock signal (that is, a reference signal for aligning (that is, synchronizing) various operation such as the irradiation (lighting) of each of the visible light source device 31 and the IR light source device 32, and the imaging of each of the camera heads 21L, 21R, at a predetermined timing shown in FIG. 4). The predetermined timing may be a timing shown in FIG. 7 or 9 in addition to the timing shown in FIG. 4.

As the genlock master, the synchronization signal generation unit 41L generates the genlock signal GLCK (described above) that is synchronized with light source synchronization signals LS1, LS2 (described below). When the frame rate of the imaged video is, for example, 60 fps, a signal component of the genlock signal GLCK is high every "1/30" seconds, similarly to the light source synchronization signal LS1, LS2 (see FIG. 4). The synchronization signal generation unit 41L transmits the genlock signal GLCK to the CCU 40R via the genlock transmission unit 44L.

Figure 4:
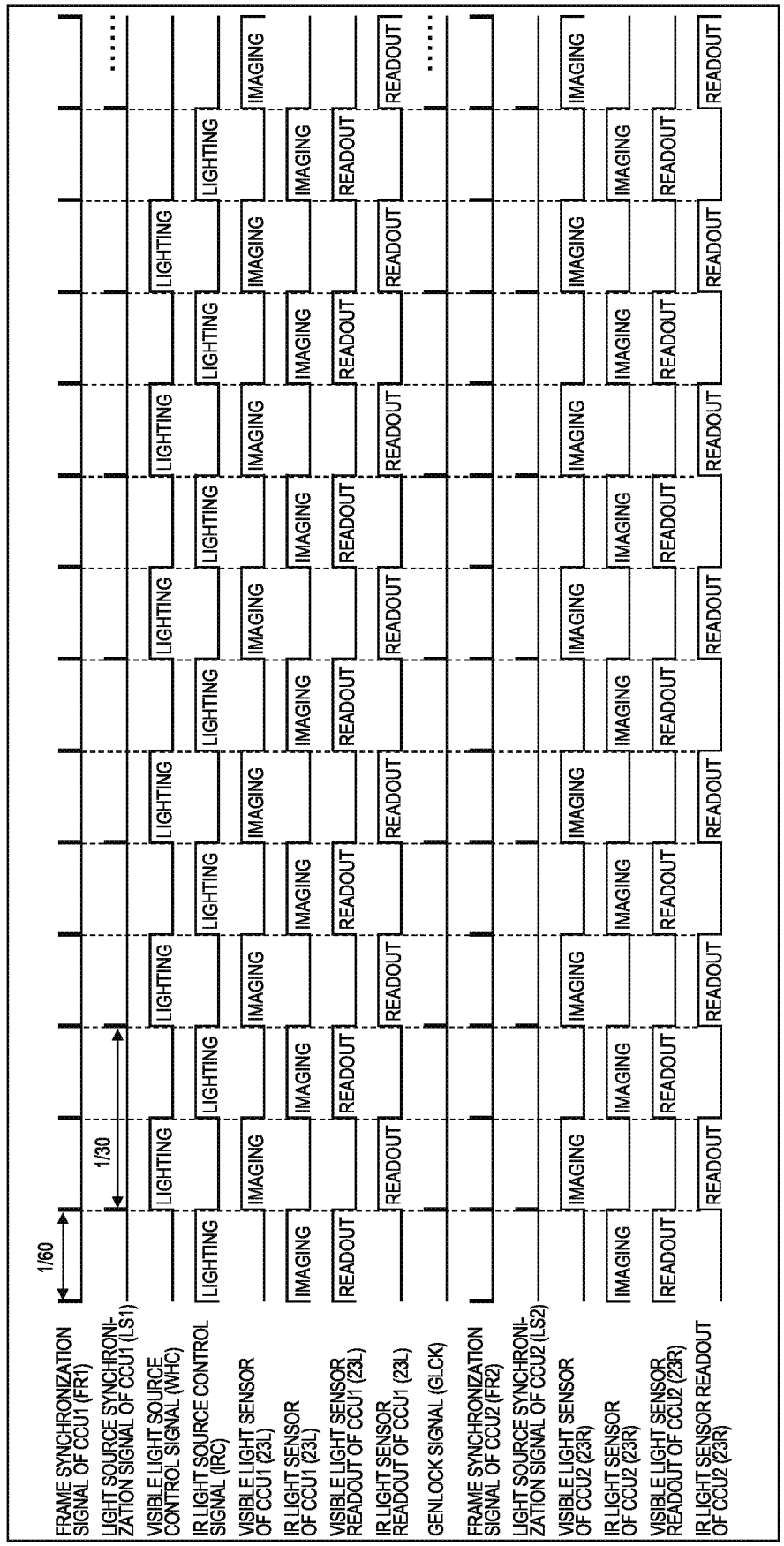
FIG. 4 is a timing chart showing an operation procedure regarding synchronization control on a visible light source device, an IR light source device and a camera head according to the first embodiment.

The synchronization signal generation unit 41L generates the frame synchronization signal FR1 of the imaged video imaged by the camera head 21L corresponding to the CCU 40L, and generates the light source synchronization signal LS1 for defining a start timing of the irradiation (lighting) of each of the visible light source device 31 and the IR light source device 32, based on the generated genlock signal GLCK. When the frame rate of the imaged video is, for example, 60 fps, a signal component of the frame synchronization signal FR1 is high every "1/60" seconds, and a signal component of the light source synchronization signal LS1 is high every "1/30" seconds as shown in FIG. 4. This is because the visible light source device 31 and the IR light source device 32 are controlled to alternately and repeatedly perform the irradiation (lighting) every "1/60" seconds. The synchronization signal generation unit 41L transmits the frame synchronization signal FR1 to the camera control unit 43L, and transmits the light source synchronization signal LS1 to the light source control unit 42L. The synchronization signal generation unit 41L may transmit the frame synchronization signal FR1 and the light source synchronization signal LS1 to the light source control unit 42L and the camera control unit 43L, respectively.

The light source control unit 42L controls a timing of irradiation (lighting) of the white light from the visible light source device 31 and a timing of irradiation (lighting) of the IR excitation light from the IR light source device 32. In response to input of the light source synchronization signal LS1 transmitted from the synchronization signal generation unit 41L, the light source control unit 42L alternately generates in a time division manner the visible light source control signal WHC and the IR light source control signal IRC for causing the visible light source device 31 and the IR light source device 32 to alternately and repeatedly irradiate (light) every "1/60" seconds. The light source control unit 42L transmits the visible light source control signal WHC to the visible light source device 31, and transmits the IR light source control signal IRC to the IR light source device 32.

In response to input of the frame synchronization signal FR1 transmitted from the synchronization signal generation unit 41L, the camera control unit 43L inputs the imaged video imaged by the camera head 21L corresponding to the CCU 40L in synchronization with the frame synchronization signal FR1. The camera control unit 43L performs various video processing on the input imaged video, generates the left eye output video for forming the 3D video that can be viewed in a three-dimensional manner in the output unit 50, and outputs the generated video to the output unit 50. The camera control unit 43L controls imaging and reading of the visible and/or IR imaging unit 23L of the corresponding camera head 21L according to the input of the frame synchronization signal FR1 (see FIG. 4).

The genlock transmission unit 44L includes a communication circuit capable of transmitting and receiving signals related to the genlock signal GLCK to and from the CCU 40R serving as a genlock slave (described below). The genlock transmission unit 44L transmits the genlock signal GLCK generated by the synchronization signal generation unit 41L to a genlock reception unit 45R of the CCU 40R.

The CCU 40R (an aspect of a second video processing device) inputs data of the imaged video imaged by the camera head 21R, performs various video processing on the data of the imaged video, and generates a right eye output video for forming a 3D video can be viewed in a three-dimensional manner in the output unit 50. The CCU 40R outputs data of the generated right eye output video to the output unit 50. The CCU 40R includes a synchronization signal generation unit 41R, a camera control unit 43R and the genlock reception unit 45R. In the example of FIG. 2, the CCU 40L serving as the genlock master transmits the visible light source control signal WHC to the visible light source device 31 and the IR light source control signal IRC to the IR light source device 32, but the CCU 40R may transmit signals. When the CCU 40R transmits the signals, the CCU 40R is provided with a corresponding light source control unit having the same configuration as the light source control unit 42L.

The synchronization signal generation unit 41R and the camera control unit 43R include, for example, a processor such as a CPU, a DSP or an FPGA. The processor executes various processing according to a predetermined program stored in a memory (not shown in FIG. 2) built in the CCU 40R, for example. The processor uses a RAM and a ROM as the memory during operation, and temporarily stores data or information generated or obtained by the processor in the RAM described above. The ROM stores a program for executing functions of the processor and various setting data. In addition, the RAM stores various data generated during processing of the processor.

In the first embodiment, the CCU 40R serves as the genlock slave. The genlock slave receives the genlock signal generated by the genlock master (that is, the reference signal for aligning (that is, synchronizing) various operation such as the irradiation (the lighting) of each of the visible light source device 31 and the IR light source device 32, and the imaging of each of the camera heads 21L, 21R, at the predetermined timing shown in FIG. 4). The predetermined timing may be the timing shown in FIG. 7 or 9 in addition to the timing shown in FIG. 4.

As the genlock slave, the synchronization signal generation unit 41R receives the genlock signal GLCK transmitted from the genlock reception unit 45R. The synchronization signal generation unit 41R generates the frame synchronization signal FR2 of the imaged video imaged by the camera head 21R corresponding to the CCU 40R, and generates the light source synchronization signal LS2 for defining the start timing of the irradiation (lighting) of each of the visible light source device 31 and the IR light source device 32, based on the genlock signal GLCK. When the frame rate of the imaged video is, for example, 60 fps, a signal component of the frame synchronization signal FR2 is high every "1/60" seconds, and a signal component of the light source synchronization signal LS2 is high every "1/30" seconds as shown in FIG. 4. This is because the visible light source device 31 and the IR light source device 32 are controlled to alternately and repeatedly perform the irradiation (lighting) every "1/60" seconds. The synchronization signal generation unit 41R transmits the frame synchronization signal FR2 to the camera control unit 43R.

In response to input of the frame synchronization signal FR2 transmitted from the synchronization signal generation unit 41R, the camera control unit 43R inputs the imaged video imaged by the camera head 21R corresponding to the CCU 40R in synchronization with the frame synchronization signal FR2. The camera control unit 43R performs various video processing on the input imaged video, generates the right eye output video for forming the 3D video can be viewed in a three-dimensional manner in the output unit 50, and outputs the generated video to the output unit 50. The camera control unit 43R controls imaging and reading of the visible and/or IR imaging unit 23R of the corresponding camera head 21R according to the input of the frame synchronization signal FR2 (see FIG. 4).

The genlock reception unit 45R includes a communication circuit capable of transmitting and receiving signals related to the genlock signal GLCK to and from the CCU 40L serving as the genlock master. The genlock reception unit 45R receives the genlock signal GLCK transmitted from the CCU 40L and transmits the genlock signal GLCK to the synchronization signal generation unit 41R.

The output unit 50 is configured using a display device such as a liquid crystal display (LCD), a cathode ray tube (CRT) or an organic electroluminescence (EL). The output unit 50 displays data of the left eye output video and the right eye output video in a two-dimensional (2D) or three-dimensional (3D) manner after various video processing are performed by the CCUs 40L, 40R. The video displayed on the output unit 50 is visually recognized by a doctor or the like during surgery, for example.

Next, operation timings of the visible light source device 31, the IR light source device 32 and the camera head 21 according to the first embodiment will be described respectively with reference to FIG. 4. FIG. 4 is a timing chart showing an operation procedure regarding synchronization control on the visible light source device 31, the IR light source device 32 and the camera head 21 (21L, 21R) according to the first embodiment.

In FIG. 4, the signal component of the genlock signal GLCK is high in synchronization with those of the light source synchronization signals LS1, LS2. When the frame rate of the imaged video is, for example, 60 fps, signal components of the frame synchronization signals FR1, FR2 in the CCUs 40L, 40R are high every "1/60" seconds, and signal components of the light source synchronization signals LS1, LS2 are high every "1/30" seconds (that is, every period twice those of the frame synchronization signals FR1, FR2). The signal components of the light source synchronization signals LS1, LS2 are high in synchronization with twice those of the frame synchronization signals FR1, FR2.

The visible light source control signal WHC is output so as to be synchronized with a first one frame period (1/60 seconds) of the light source synchronization signals LS1, LS2 (that is, twice those of the frame synchronization signals FR1, FR2). The IR light source control signal IRC is output so as to be synchronized with a latter one frame period (1/60 seconds) of the light source synchronization signals LS1, LS2 (that is, twice those of the frame synchronization signals FR1, FR2). Therefore, the white light is emitted from the visible light source device 31 during the first one frame period, and the IR excitation light is emitted from the IR light source device 32 during the latter one frame period in twice the periods of the frame synchronization signals FR1, FR2, so that the white light and the IR excitation light are alternately emitted every frame period (1/60 seconds).

The visible and/or IR imaging units 23L, 23R of the camera heads 21L, 21R image the white light (the visible light) that has passed through the imaging optical systems 22L, 22R from the subject SUB in the first one frame period (1/60 seconds) of the light source synchronization signals LS1, LS2, in synchronization with an irradiation period (a lighting period) of the white light from the visible light source device 31. The visible and/or IR imaging units 23L, 23R perform readout such as sampling an electrical signal of the imaged video imaged, and output the readout result to corresponding CCUs 40L, 40R in the latter one frame period (1/60 seconds), in synchronization with a non-irradiation period (a non-lighting period) of the white light from the visible light source device 31.

The visible and/or IR imaging units 23L, 23R of the camera heads 21L, 21R image the fluorescence that has passed through the imaging optical systems 22L, 22R from the subject SUB in the latter one frame period (1/60 seconds) of the light source synchronization signals LS1, LS2, in synchronization with an irradiation period (a lighting period) of the IR excitation light from the IR light source device 32. The visible and/or IR imaging units 23L, 23R perform readout such as sampling an electrical signal of the imaged video imaged, and outputs the readout result to corresponding CCUs 40L, 40R in the first one frame period (1/60 seconds), in synchronization with a non-irradiation period (a non-lighting period) of the IR excitation light from the IR light source device 32.

Figure 5:
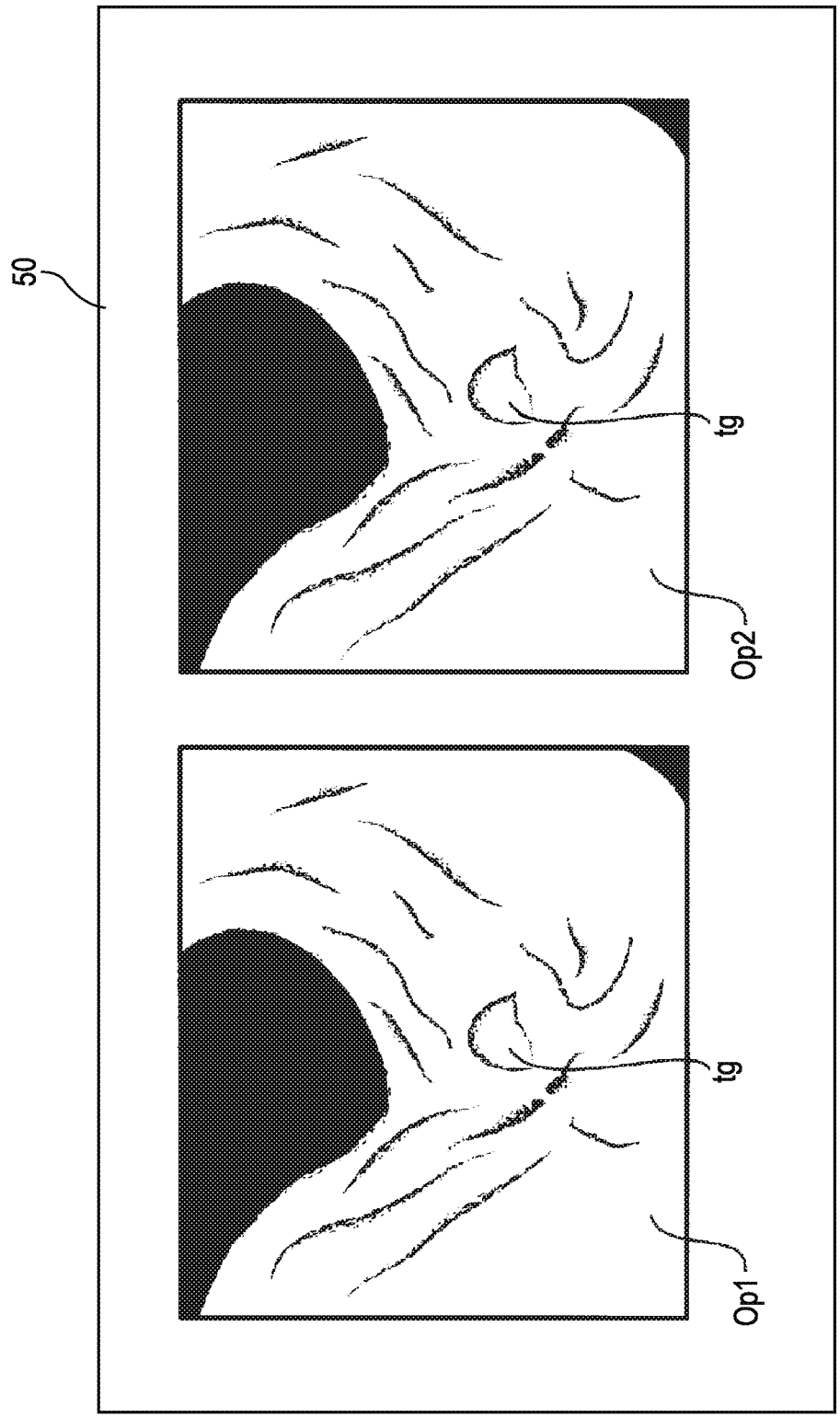
FIG. 5 is a view showing an example of a left eye output video and a right eye output video respectively output from CCUs when visible light is emitted.
Figure 6:
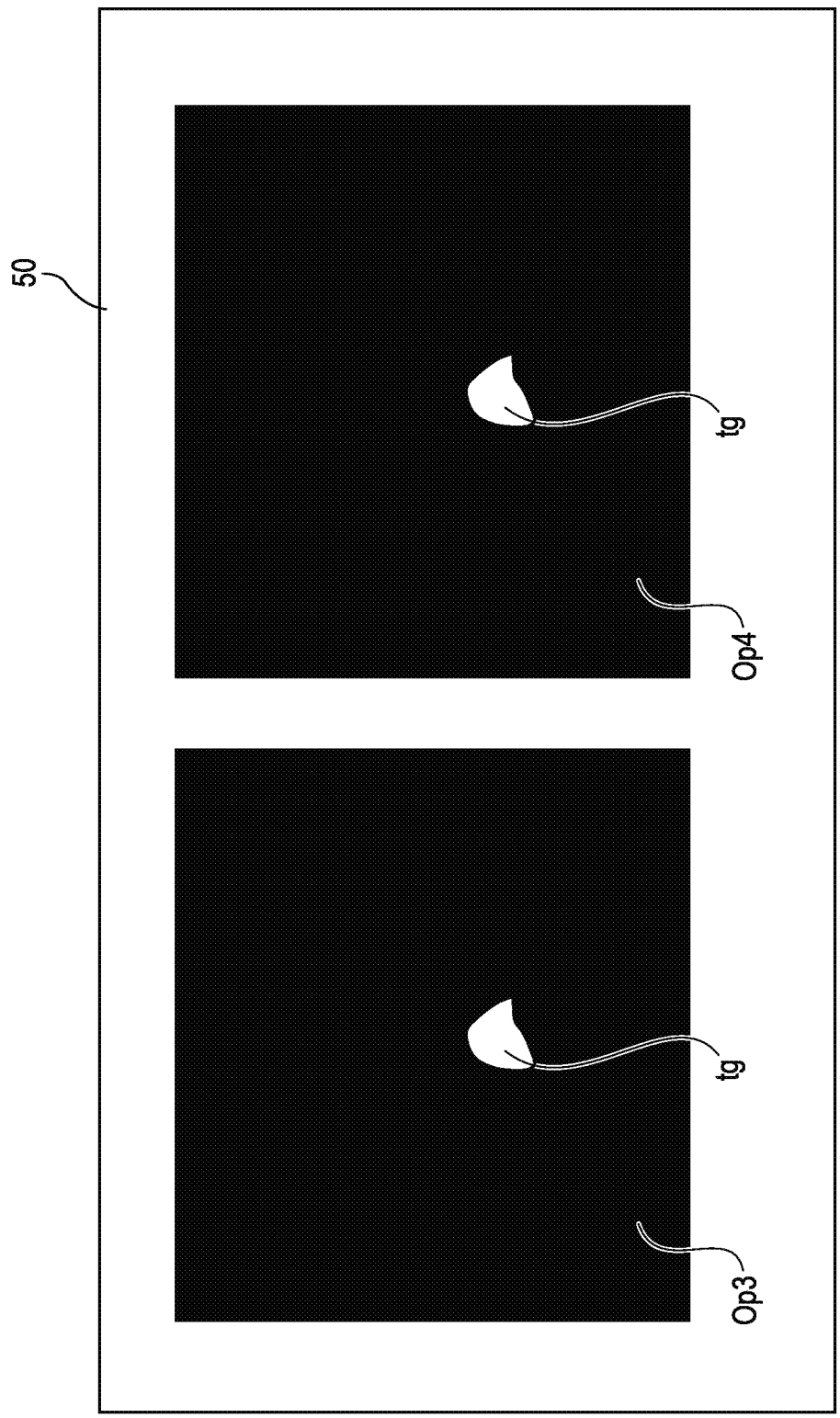
FIG. 6 is a view showing an example of a left eye output video and a right eye output video respectively output from the CCUs when IR excitation light is emitted.

FIG. 5 is a view showing an example of a left eye output video Op1 and a right eye output video Op2 respectively output from the CCUs 40L, 40R when the visible light is emitted. FIG. 6 is a view showing an example of a left eye output video Op3 and a right eye output video Op4 respectively output from the CCUs 40L, 40R when the IR excitation light is emitted. For easy understanding of the description, in FIGS. 5 and 6, the left eye output video Op1 and the right eye output video Op2 as well as the left eye output video Op3 and the right eye output video Op4 are both shown as being separated from each other in the output unit 50, but may be displayed in a 3D overlapping manner.

As shown in FIG. 4, based on the genlock signal GLCK synchronized with the light source synchronization signals LS1, LS2 in the same period, the operation such as the irradiation (lighting) of each of the visible light source device 31 and the IR light source device 32, the imaging of each of the camera heads 21L, 21R, are aligned (that is, synchronized) at the predetermined timing shown in FIG. 4. Thereby, as shown in FIG. 5, the left eye output image Op1 and the right eye output image Op2, which are obtained in a section lit by the white light from the visible light source device 31 and show an affected part tg, are output videos having favorable image quality since the left eye output video Op1 and the right eye output video Op2 are obtained by imaging with each of the plurality of camera heads 21L, 21R synchronized with the light source synchronization signals LS1, LS2 in the same period. Therefore, the output unit 50 forms a predetermined parallax between the left eye output image Op1 and the right eye output image Op2 according to, for example, a simulcast method, and thus can display a video in which a state of the surgical field is brightly lit in a three-dimensional (3D) manner.

As shown in FIG. 6, the left eye output video Op3 and the right eye output video Op4, which are obtained in a section lit by the IR excitation light from the IR light source device 32 and are black except for the affected part tg that emits the fluorescence, are output videos having favorable image quality since the left eye output video Op3 and the right eye output video Op4 are obtained by imaging with each of the plurality of camera heads 21L, 21R synchronized with the light source synchronization signals LS1, LS2 in the same period. Therefore, the output unit 50 forms a predetermined parallax between the left eye output video Op3 and the right eye output video Op4 according to, for example, a simulcast method, and thus can display a video in which a state of fluorescence can be determined in a three-dimensional (3D) manner.

As described above, the medical camera system 100 according to the first embodiment includes the visible light source device 31 and the IR light source device 32 that irradiate the subject SUB with light having different wavelength bands, and the camera heads 21L, 21R that image the subject SUB. The medical camera system 100 includes the CCUs 40L, 40R that are provided corresponding to the camera heads 21L, 21R, and process the imaged video of the subject SUB imaged by any corresponding camera head and output the processed image to the output unit 50. The visible light source device 31 and the IR light source device 32 alternately are turned on in synchronization with every frame period (for example, ⅟₆₀ seconds) of the imaged video or an integer multiple (for example, twice) thereof based on the genlock signal GLCK. The camera head 21L performs imaging in synchronization with the lighting of each of the visible light source device 31 and the IR light source device 32. The camera head 21R performs imaging in synchronization with the lighting of each of the visible light source device 31 and the IR light source device 32.

Thereby, according to the medical camera system 100, the plurality of light source devices (for example, the visible light source device 31 and the IR light source device 32) and the plurality of imaging devices (for example, the camera heads 21L, 21R) can be operated in synchronization at the predetermined timing during the medical action such as the microscopic surgery or the endoscopic surgery. Therefore, according to the medical camera system 100, the output (for example, display) of a three-dimensional output video (a 3D video) having favorable image quality of a surgical target site can be supported, so that the doctor or the like can appropriately grasp a detailed situation of the surgical target site.

The CCU 40L generates the genlock signal GLCK having a period the same as that of the light source synchronization signals LS1, LS2 for instructing the lighting of each of the visible light source device 31 and the IR light source device 32 in synchronization with two frame periods of the imaged video (the timing when the signal component is high matches) and transmits the genlock signal GLCK to the CCU 40R. The CCU 40L controls the lighting of each of the visible light source device 31 and the IR light source device 32 and the imaging of the corresponding camera head 21L based on the genlock signal GLCK. Thereby, since the lighting of each of the visible light source device 31 and the IR light source device 32 and the imaging of the corresponding camera head 21L are synchronized with each other, the imaged video (for example, a visible video or a fluorescent video) of the subject SUB is appropriately obtained from the camera head 21L in accordance with the lighting of each of the visible light source device 31 and the IR light source device 32.

The CCU 40R controls the imaging of the corresponding camera head 21R based on the genlock signal GLCK transmitted from the CCU 40L. Thereby, since the lighting of each of the visible light source device 31 and the IR light source device 32 and the imaging of the corresponding camera heads 21L, 21R are synchronized with each other, the imaged video (for example, the visible video or the fluorescent video) of the subject SUB is appropriately obtained from each of the camera heads 21L, 21R, and the output video that can be displayed in a three-dimensional manner in the output unit 50 is appropriately obtained, in accordance with the lighting of each of the visible light source device 31 and the IR light source device 32.

The visible light source device 31 emits the visible light. The IR light source device 32 emits the excitation light (the IR excitation light) in an IR region for causing the fluorescent substance (for example, ICG) administered to the subject SUB to emit fluorescence. Thereby, the three-dimensional video when the surgical field of the subject SUB is brightly irradiated with the white light, and the three-dimensional video of the fluorescence generated by the IR excitation light at the affected part tg of the subject SUB can be displayed together in the output unit 50.

The CCU 40L outputs a left eye imaged video (the left eye output video) generated based on a predetermined video processing to the output unit 50. The CCU 40R outputs a right eye imaged video (right eye output video) generated based on a predetermined video processing to the output unit 50. Thereby, the doctor or the like can visually confirm the three-dimensional output video (the 3D video) having favorable image quality of surgical target site by the output unit 50, and therefore can appropriately grasp the detailed situation of the surgical target site.

Second Embodiment

Figure 7:
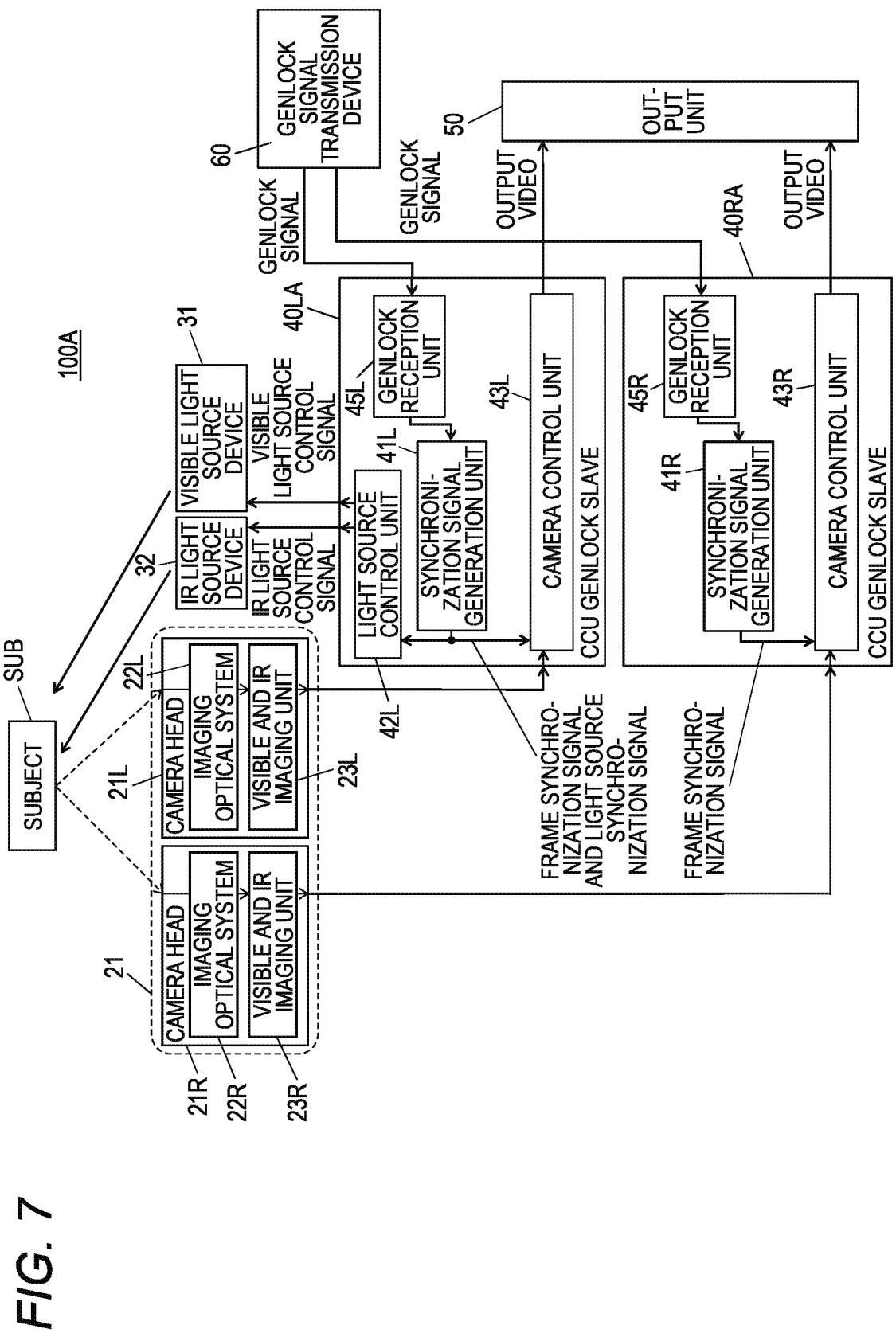
FIG. 7 is a block diagram showing a system configuration example of a medical camera system according to a second embodiment.

In a second embodiment, similarly to the first embodiment, a medical camera system 100A used when a medical action using a surgical microscope is performed will be described as an example. FIG. 7 is a block diagram showing a system configuration example of the medical camera system 100A according to the second embodiment. In the description of FIG. 7, the same components as those of the medical camera system 100 shown in FIG. 2 are denoted by the same reference numerals and the description thereof will be simplified or omitted, and different contents will be described.

The medical camera system 100A according to the second embodiment includes the visible light source device 31, the IR light source device 32, the camera head 21, CCUs 40LA, 40RA, the output unit 50 and the genlock signal transmission device 60. In the second embodiment, unlike the first embodiment, a genlock master is not the CCU 40LA but the genlock signal transmission device 60. In other words, in the second embodiment, both CCUs 40LA, 40RA serve as a genlock slave that receives the genlock signal GLCK transmitted from the genlock signal transmission device 60.

The CCU 40LA (an aspect of the first video processing device) inputs data of the imaged video imaged by the camera head 21L, performs various video processing on the data of the imaged video, and generates a left eye output video for forming a 3D video that can be viewed in a three-dimensional manner in the output unit 50. The CCU 40LA outputs data of the generated left eye output video to the output unit 50. The CCU 40LA includes the synchronization signal generation unit 41L, the light source control unit 42L, the camera control unit 43L and a genlock reception unit 45L.

As the genlock slave, the synchronization signal generation unit 41L receives a genlock signal GLCK1 received by the genlock reception unit 45L. The synchronization signal generation unit 41L generates the frame synchronization signal FR1 of the imaged video imaged by the camera head 21L corresponding to the CCU 40LA, and generates the light source synchronization signal LS1 for defining the start timing of irradiation (lighting) of each of the visible light source device 31 and the IR light source device 32, based on the genlock signal GLCK1.

The genlock reception unit 45L includes a communication circuit capable of transmitting and receiving signals related to the genlock signal GLCK1 to and from the genlock signal transmission device 60 serving as the genlock master. The genlock reception unit 45L receives the genlock signal GLCK1 transmitted from the genlock signal transmission device 60 and transmits the received signal to the synchronization signal generation unit 41L.

The CCU 40RA (an aspect of the second video processing device) inputs data of the imaged video imaged by the camera head 21R, performs various video processing on the data of the imaged video, and generates a right eye output video for forming a 3D video can be viewed in a three-dimensional manner in the output unit 50. The CCU 40RA outputs data of the generated right eye output video to the output unit 50. The CCU 40RA includes the synchronization signal generation unit 41R, the camera control unit 43R and the genlock reception unit 45R.

As the genlock slave, the synchronization signal generation unit 41R receives a genlock signal GLCK2 received by the genlock reception unit 45R. The synchronization signal generation unit 41R generates the frame synchronization signal FR2 of the imaged video imaged by the camera head 21R corresponding to the CCU 40LR, and generates the light source synchronization signal LS2 for defining the start timing of irradiation (lighting) of each of the visible light source device 31 and the IR light source device 32, based on the genlock signal GLCK2.

The genlock reception unit 45R includes a communication circuit capable of transmitting and receiving signals related to the genlock signal GLCK2 to and from the genlock signal transmission device 60 serving as the genlock master. The genlock reception unit 45R receives the genlock signal GLCK2 transmitted from the genlock signal transmission device 60 and transmits the received signal to the synchronization signal generation unit 41R.

As the genlock master, the genlock signal transmission device 60 (an aspect of an external device) generates the genlock signals GLCK1, GLCK2 that are synchronized with the light source synchronization signals LS1, LS2, respectively. The genlock signal transmission device 60 transmits the genlock signal GLCK1 to the CCU 40LA, and transmits the genlock signal GLCK2 to the CCU 40RA. When a frame rate of the imaged video is, for example, 60 fps, signal components of the genlock signals GLCK1, GLCK2 are high every "1/30" seconds, similarly to those of the light source synchronization signals LS1, LS2 (see FIG. 8).

Figure 8:
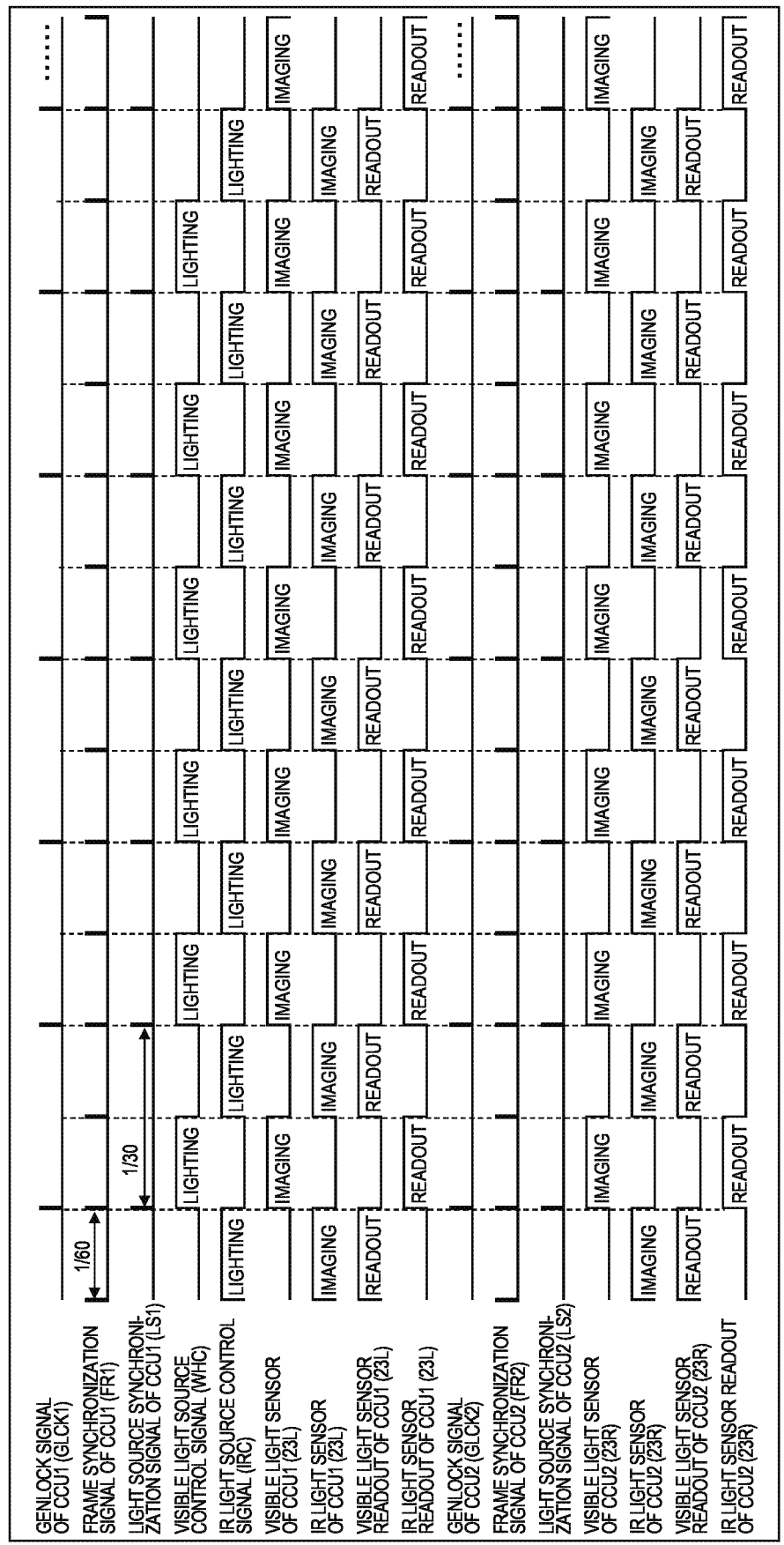
FIG. 8 is a timing chart showing an operation procedure regarding synchronization control on a visible light source device, an IR light source device and a camera head according to the second embodiment.

Next, operation timings of the visible light source device 31, the IR light source device 32 and the camera head 21 according to the second embodiment will be described with reference to FIG. 8. FIG. 8 is a timing chart showing an operation procedure regarding synchronization control on the visible light source device 31, the IR light source device 32 and the camera head 21 according to the second embodiment. In FIG. 8, the same reference numerals are given to the same contents as the operation timings of the units in FIG. 4 and the description thereof will be simplified or omitted, and different contents will be described.

In FIG. 8, the genlock signals GLCK1, GLCK2 are simultaneously input from the genlock signal transmission device 60 serving as the genlock master to the CCUs 40LA, 40RA serving as the genlock slave. The genlock signals GLCK1, GLCK2 have the same period, and the timings when the signal components are high are the same. Similarly to the first embodiment, when the frame rate of the imaged video is, for example, 60 fps, the signal components of the genlock signals GLCK1, GLCK2 are high at every "1/30" seconds similarly to those of the light source synchronization signals LS1, LS2, and the timings when the signal components are high are also the same. Since subsequent processing is the same as operation of the medical camera system 100 according to the first embodiment, detailed description thereof will be omitted.

As described above, in the medical camera system 100A according to the second embodiment, the CCUs 40LA, 40RA simultaneously receive the genlock signals GLCK1, GLCK2, which have a period the same as that of the light source synchronization signals LS1, LS2 instructing the lighting of the visible light source device 31 and the IR light source device 32, from the genlock signal transmission device 60, respectively. Thereby, since both the CCUs 40LA, 40RA serve as the genlock slave, processing of generating the genlock signal by the CCU 40LA as in the first embodiment can be omitted, and a processing load on the CCU 40LA can be reduced.

The CCU 40LA controls the lighting of each of the visible light source device 31 and the IR light source device 32 and the imaging of the corresponding camera head 21L based on the received genlock signal GLCK1. The CCU 40RA controls the imaging of the corresponding camera head 21R based on the received genlock signal GLCK2. Thereby, since the genlock signals GLCK1, GLCK2 having the same period and the same signal component high timing from the genlock signal transmission device 60 are respectively input to the CCUs 40LA, 40RA, the left eye output video and the right eye output video having good image quality can be obtained by synchronizing the timings of the lighting of the visible light source device 31 and the IR light source device 32 and the imaging of each of the camera heads 21L, 21R even if one of the CCUs 40LA, 40RA does not generate the genlock signal.

Third Embodiment

Figure 9:
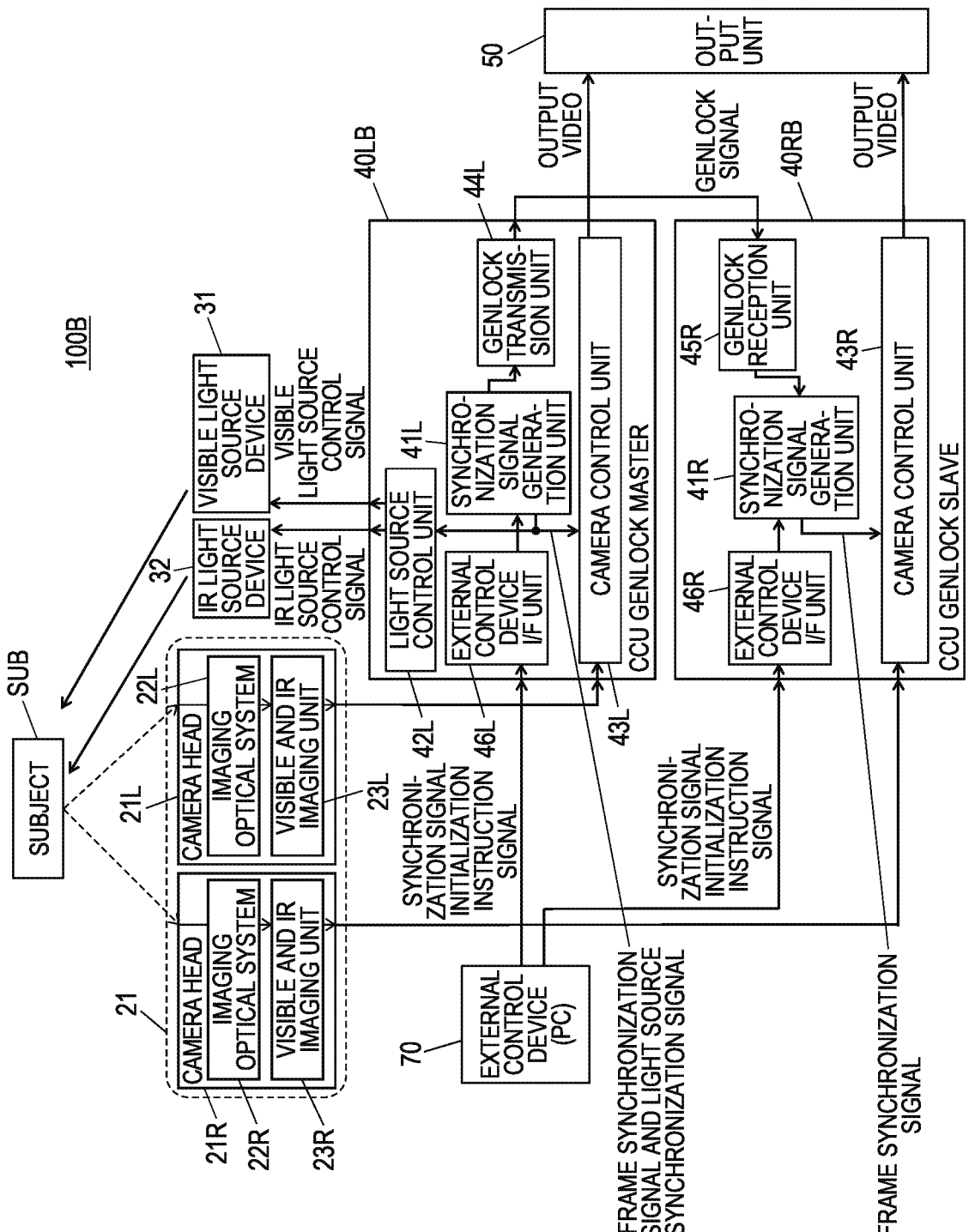
FIG. 9 is a block diagram showing a system configuration example of a medical camera system according to a third embodiment.

In a third embodiment, similarly to the first and second embodiments, a medical camera system 100B used when a medical action using a surgical microscope is performed will be described as an example. FIG. 9 is a block diagram showing a system configuration example of the medical camera system 100B according to the third embodiment. In the description of FIG. 9, the same components as those of the medical camera system 100 shown in FIG. 2 are denoted by the same reference numerals and the description thereof will be simplified or omitted, and different contents will be described.

The medical camera system 100B according to the third embodiment includes the visible light source device 31, the IR light source device 32, the camera head 21, CCUs 40LB, 40RB, the output unit 50 and an external control device 70. In the third embodiment, similarly to the first embodiment, the genlock master is one of the two CCUs 40LB, 40RB (for example, the CCU 40LB). In other words, in the third embodiment, the CCU 40LB serves as the genlock master that generates the genlock signal GLCK, and the CCU 40RB serves as a genlock slave that receives the genlock signal GLCK.

The CCU 40LB (an aspect of the first video processing device) inputs data of the imaged video imaged by the camera head 21L, performs various video processing on the data of the imaged video, and generates a left eye output video for forming a 3D video that can be viewed in a three-dimensional manner in the output unit 50. The CCU 40LB outputs data of the generated left eye output video to the output unit 50. The CCU 40LB includes the synchronization signal generation unit 41L, the light source control unit 42L, the camera control unit 43L, the genlock transmission unit 44L and an external control device I/F unit 46L.

Figure 10:
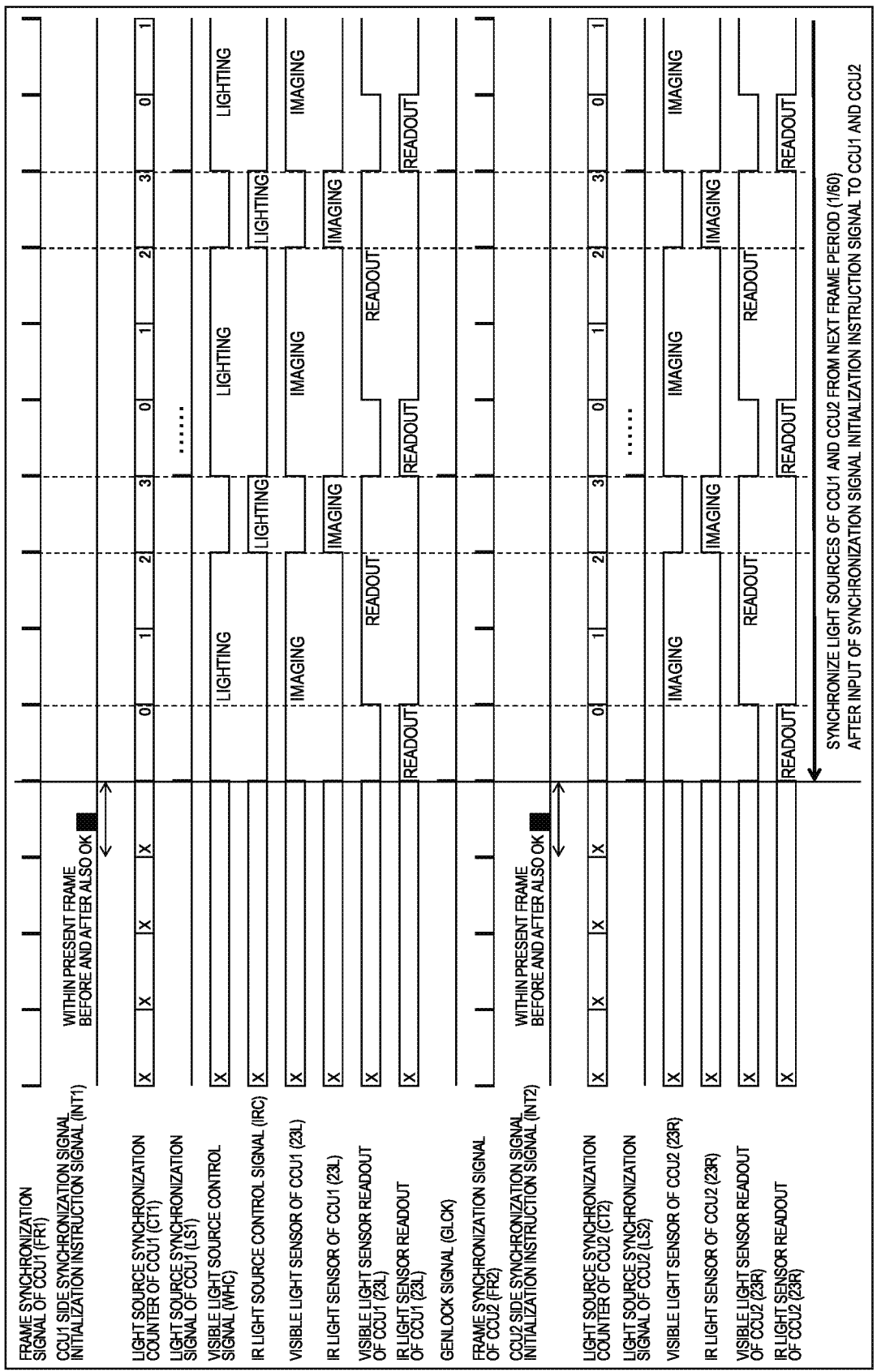
FIG. 10 is a timing chart showing an operation procedure regarding synchronization control on a visible light source device, an IR light source device and a camera head according to the third embodiment.

Upon receiving a synchronization signal initialization instruction signal INT1 via the external control device I/F unit 46L in a frame period (see FIG. 10), the synchronization signal generation unit 41L generates the genlock signal GLCK for aligning (that is, synchronizing) operation such as irradiation (lighting) of each of the visible light source device 31 and the IR light source device 32 and imaging of each of the camera heads 21L, 21R from the next frame period at a predetermined timing shown in FIG. 10. The synchronization signal initialization instruction signal INT1 is an instruction signal for initializing (resetting) synchronization of the operation such as the irradiation (the lighting) of each of the visible light source device 31 and the IR light source device 32 and the imaging of each of the camera heads 21L, 21R. This is because the synchronization of the operation such as the irradiation (the lighting) of each of the visible light source device 31 and the IR light source device 32 and the imaging of each of the camera heads 21L, 21R is likely to be lost due to aging or the like, and this lost synchronization is reset (initialized). As the genlock master, the synchronization signal generation unit 41L generates the genlock signal GLCK (described above) that is synchronized with the light source synchronization signals LS1, LS2, and transmits the genlock signal GLCK to the CCU 40RB via the genlock transmission unit 44L. When a frame rate of the imaged video is, for example, 60 fps, the signal component of the genlock signal GLCK is high every "$\frac{1}{15}$" seconds similarly to those of the light source synchronization signals LS1, LS2, and timings when signal components are high are also the same (see FIG. 10).

The synchronization signal generation unit 41L generates the frame synchronization signal FR1 of the imaged video imaged by the camera head 21L corresponding to the CCU 40LB based on the generated genlock signal GLCK. The synchronization signal generation unit 41L includes a light source synchronization counter CT1, and generates the light source synchronization signal LS1 for defining the start timing of the irradiation (the lighting) of each of the visible light source device 31 and the IR light source device 32, based on the genlock signal GLCK and a value of the light source synchronization counter CT1. If the light source synchronization counter CT1 is provided in the CCU 40LB, the synchronization signal generation unit 41L may not include the light source synchronization counter CT1. When the frame rate of the imaged video is, for example, 60 fps, the signal component of the frame synchronization signal FR1 is high every "$\frac{1}{60}$" seconds, and the signal component of the light source synchronization signal LS1 is high every "$\frac{1}{15}$" seconds as shown in FIG. 10. This is because the visible light source device 31 performs irradiation (lighting) for three times the frame period (for example, "$\frac{1}{60}$"×3), and then the IR light source device 32 performs irradiation (lighting) for the frame period (for example, "$\frac{1}{60}$"×1), and the visible light source device 31 and the IR light source device 32 are controlled to repeat those irradiation (lighting) patterns. The synchronization signal generation unit 41L transmits the frame synchronization signal FR1 to the camera control unit 43L, and transmits the light source synchronization signal LS1 to the light source control unit 42L. The synchronization signal generation unit 41L may transmit the frame synchronization signal FR1 and the light source synchronization signal LS1 to the light source control unit 42L and the camera control unit 43L respectively.

The light source control unit 42L controls a timing of irradiation (lighting) of the white light from the visible light source device 31 and a timing of irradiation (lighting) of the IR excitation light from the IR light source device 32. The light source control unit 42L generates the visible light source control signal WHC for causing the visible light source device 31 continuously perform the irradiation (the lighting) during a period (that is, a period three times the frame period) during which the value of the light source synchronization counter CT1 changes from "0" to "2" and generates the IR light source control signal IRC for causing the IR light source device 32 to perform the irradiation (the lighting) during a period (that is, a period of the frame period) during which the value of the light source synchronization counter CT1 changes from "2" to "3", in response to input of the light source synchronization signal LS1 transmitted from the synchronization signal generation unit 41L. Values of the light source synchronization counters CT1, CT2 change to "0", "1", "2", "3", and return to "0" after "3". That is, the values of the light source synchronization counters CT1, CT2 change such that a period (four times the frame period) of the light source synchronization signal LS1 is used as a reference repeatedly. The light source control unit 42L transmits the visible light source control signal WHC to the visible light source device 31, and transmits the IR light source control signal IRC to the IR light source device 32.

The external control device I/F unit 46L includes a communication circuit capable of transmitting and receiving signals related to the synchronization signal initialization instruction signal INT1 to and from the external control device 70. Upon receiving the synchronization signal initialization instruction signal INT1 transmitted from the external control device 70, the external control device I/F unit 46L transfers the received signal to the synchronization signal generation unit 41L.

The CCU 40RB (an aspect of the second video processing device) inputs data of the imaged video imaged by the camera head 21R, performs various video processing on the data of the imaged video, and generates a right eye output video for forming a 3D video can be viewed in a three-dimensional manner in the output unit 50. The CCU 40RB outputs data of the generated right eye output video to the output unit 50. The CCU 40RB includes the synchronization signal generation unit 41R, the camera control unit 43R, the genlock reception unit 45R and an external control device I/F unit 46R.

Upon receiving a synchronization signal initialization instruction signal INT2 via the external control device I/F unit 46R in the frame period (see FIG. 10), the synchronization signal generation unit 41R receives the genlock signal GLCK transmitted from the CCU 40LB serving as the genlock master. The synchronization signal initialization instruction signal INT2 is an instruction signal for initializing (resetting) synchronization of the operation such as the irradiation (the lighting) of each of the visible light source device 31 and the IR light source device 32 and the imaging of each of the camera heads 21L, 21R.

The synchronization signal generation unit 41R generates the frame synchronization signal FR2 of the imaged video imaged by the camera head 21R corresponding to the CCU 40RB based on the genlock signal GLCK. The synchronization signal generation unit 41R includes the light source synchronization counter CT2, and generates the light source synchronization signal LS2 for defining the start timing of the irradiation (the lighting) of each of the visible light source device 31 and the IR light source device 32, based on the genlock signal GLCK and the value of the light source synchronization counter CT2. If the light source synchronization counter CT2 is provided in the CCU 40RB, the synchronization signal generation unit 41R may not include the light source synchronization counter CT2. When the frame rate of the imaged video is, for example, 60 fps, the signal component of the frame synchronization signal FR2 is high every "1/60" seconds, and the signal component of the light source synchronization signal LS2 is high every "1/15" seconds as shown in FIG. 10. This is because the visible light source device 31 performs irradiation (lighting) for three times the frame period (for example, "1/60"×3), and then the IR light source device 32 performs irradiation (lighting) for the frame period (for example, "1/60"×1), and the visible light source device 31 and the IR light source device 32 are controlled to repeat those irradiation (lighting) patterns. The synchronization signal generation unit 41R transmits the frame synchronization signal FR2 to the camera control unit 43R.

The external control device I/F unit 46R includes a communication circuit capable of transmitting and receiving signals related to the synchronization signal initialization instruction signal INT2 to and from the external control device 70. Upon receiving the synchronization signal initialization instruction signal INT2 transmitted from the external control device 70, the external control device I/F unit 46R transfers the received signal to the synchronization signal generation unit 41R.

The external control device 70 (an aspect of a second external device) is formed by an information processing device (that is, a computer) such as a personal computer (PC), generates the synchronization signal initialization instruction signals INT1, INT2, and transmits the generated signals to the CCUs 40LB, 40RB respectively.

Next, operation timings of the visible light source device 31, the IR light source device 32 and the camera head 21 according to the third embodiment will be described with reference to FIG. 10. FIG. 10 is a timing chart showing an operation procedure regarding synchronization control on the visible light source device 31, the IR light source device 32 and the camera head 21 according to the third embodiment. In FIG. 10, the same reference numerals are given to the same contents as the operation timings of the units in FIG. 4 and the description thereof will be simplified or omitted, and different contents will be described.

In FIG. 10, for example, the synchronization of the operation such as the irradiation (the lighting) of each of the visible light source device 31 and IR light source device 32 and the imaging of each of the camera heads 21L, 21R is lost until the synchronization signal initialization instruction signals INT1, INT2 are respectively input to the CCUs 40LB, 40RB from the external control device 70 within a fourth frame period. For example, the synchronization signal initialization instruction signals INTL INT2 are respectively input to the CCUs 40LB, 40RB from the external control device 70 at any timing within the fourth frame period. In this case, upon receiving the synchronization signal initialization instruction signal INT1, the CCU 40LB serving the genlock master generates the genlock signal GLCK for aligning (that is, synchronizing) the operation such as the irradiation (the lighting) of each of the visible light source device 31 and the IR light source device 32 and the imaging of each of the camera heads 21L, 21R from the next fifth frame period at the predetermined timing shown in FIG. 10.

The signal component of the genlock signal GLCK is high in synchronization with those of the light source synchronization signals LS1, LS2. When the frame rate of the imaged video is, for example, 60 fps, signal components of the frame synchronization signals FR1, FR2 in the CCUs 40LB, 40RB are high every "1/60" seconds, and signal components of the light source synchronization signals LS1, LS2 are high every "1/15" seconds (that is, every period four times those of the frame synchronization signals FR1, FR2). The signal components of the light source synchronization signal LS1, LS2 are high in synchronization with four times those of the frame synchronization signals FR1, FR2.

The visible light source control signal WHC is output so as to be synchronized with a first three frame periods (1/20 seconds) of the light source synchronization signals LS1, LS2 (that is, four times the frame synchronization signals FR1, FR2). The IR light source control signal IRC is output so as to be synchronized with a latter one frame period (1/60 seconds) of the light source synchronization signals LS1, LS2 (that is, four times the frame synchronization signals FR1, FR2). Output periods of the visible light source control signal WHC and the IR light source control signal RC is not limited to the example of FIG. 10, and the output periods may be reversed. Therefore, the white light is emitted from the visible light source device 31 during the first three frame periods of four times the frame period of the frame synchronization signals FR1, FR2, and the IR excitation light is emitted from the IR light source device 32 during the latter one frame period thereof.

The visible and/or IR imaging units 23L, 23R of the camera heads 21L, 21R image the white light (the visible light) that has passed through the imaging optical systems 22L, 22R from the subject SUB in the first three frame periods (1/20 seconds) of the light source synchronization signals LS1, LS2 based on the value of the light source synchronization counter CT1, in synchronization with an irradiation period (a lighting period) of the white light from the visible light source device 31 (the value of the light source synchronization counter CT: 0, 1, 2). The visible and/or IR imaging units 23L, 23R perform readout such as sampling an electrical signal of the imaged video and output the readout result to corresponding CCUs 40L, 40R from a second frame period as the irradiation period (the lighting period) of the white light from the visible light source device 31 to the fourth frame period including three frame periods (1/20 seconds) based on the value of the light source synchronization counter CT1 (the value of light source synchronization counter CT: 1, 2, 3).

The visible and/or IR imaging units 23L, 23R of the camera heads 21L, 21R image fluorescence that has passed through the imaging optical systems 22L, 22R from the subject SUB in the latter one frame period (1/60 seconds) of the light source synchronization signals LS1, LS2 based on the value of the light source synchronization counter CT2, in synchronization with an irradiation period (a lighting period) of the IR excitation light from the IR light source device 32 (the value of the light source synchronization counter CT: 3). The visible and/or IR imaging units 23L, 23R perform readout such as sampling an electrical signal of the imaged video and output the readout result to corresponding CCUs 40L, 40R in a period (1/60 seconds) as the frame period immediately after the irradiation period (the lighting period) of the IR excitation light from the IR light source device 32 based on the value of the light source synchronization counter CT2.

As described above, in the medical camera system 100B according to the third embodiment, the CCUs 40LB, 40RB receives the synchronization signal initialization instruction signals INT1, INT2 (an aspect of an initialization signal) for initializing synchronization timings of the lighting of each of the visible light source device 31 and the IR light source device 32 and the imaging of the camera heads 21L, 21R from the external control device 70 within the frame period of the imaged video. Thereby, even when the synchronization of the operation such as the irradiation (the lighting) of each of the visible light source device 31 and IR light source device 32 and the imaging of each of the camera heads 21L, 21R are lost due to aging or the like, the medical camera system 100B can perform synchronization by initializing the synchronization timings of the lighting of each of the visible light source device 31 and the IR light source device 32 and the imaging of each of the camera heads 21L, 21R based on reception of the synchronization signal initialization instruction signals INT1, INT2.

The CCU 40LB generates the genlock signal GLCK having a period the same as those of the light source synchronization signals LS1, LS2 for instructing the lighting of each of the visible light source device 31 and the IR light source device 32, so as to be synchronized with, for example, four times the frame period of the imaged video, and transmits the genlock signal GLCK to the CCU 40RB based on the reception of the synchronization signal initialization instruction signals. The CCU 40LB controls the lighting of each of the visible light source device 31 and the IR light source device 32 and the imaging of the corresponding camera head 21L based on the genlock signal GLCK. Thereby, even when the synchronization of the operation such as the irradiation (the lighting) of each of the visible light source device 31 and the IR light source device and the imaging of each of the camera heads 21L, 21R is lost due to aging or the like, the imaged video (for example, a visible video or a fluorescent video) of the subject SUB is appropriately obtained from the camera head 21L in accordance with the lighting of each of the visible light source device 31 and the IR light source device 32 since the lighting of each of the visible light source device 31 and the IR light source device 32 and the imaging of the corresponding camera head 21L are synchronized.

Fourth Embodiment

Figure 11:
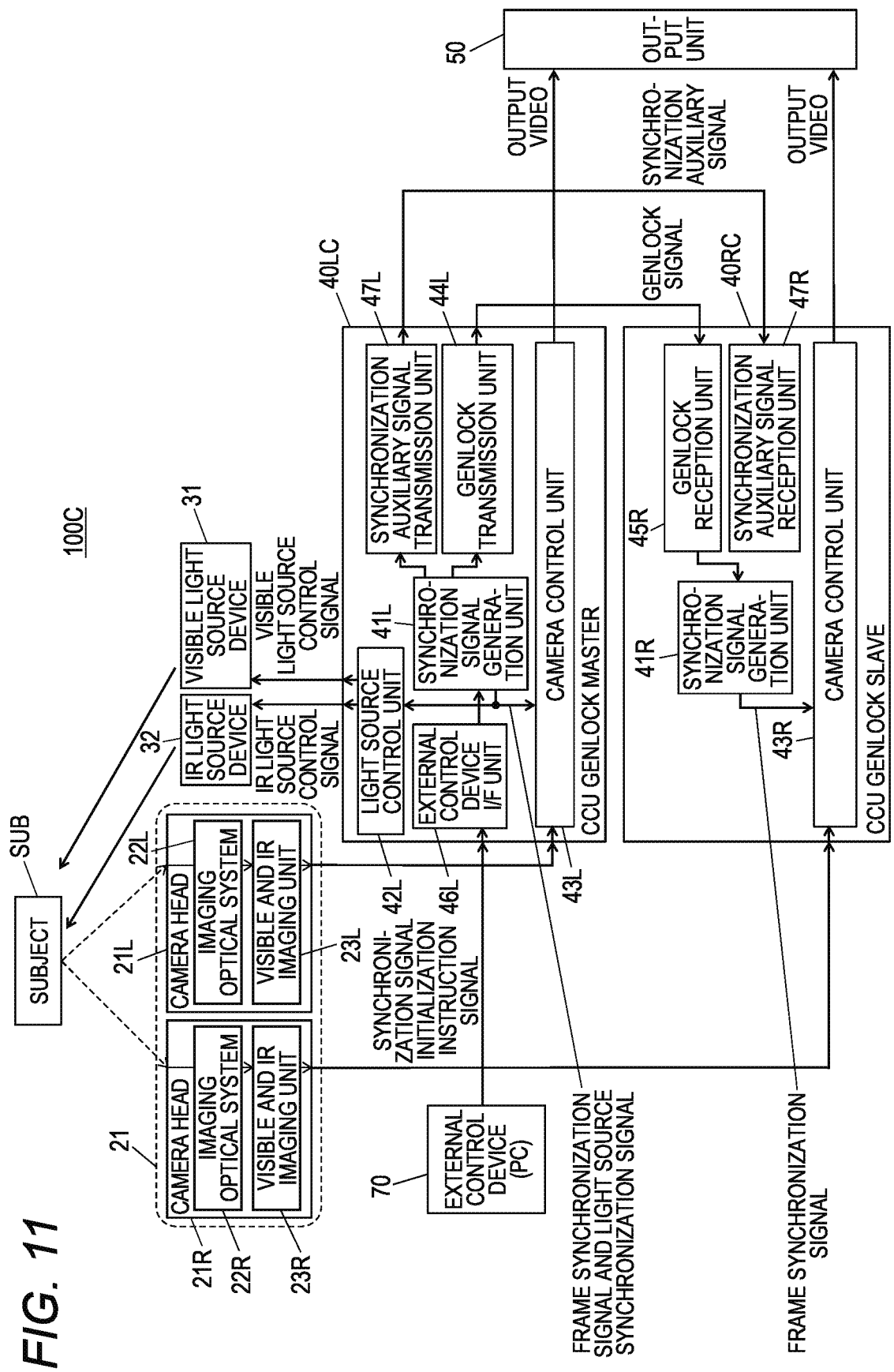
FIG. 11 is a block diagram showing a system configuration example of a medical camera system according to a fourth embodiment.

In a fourth embodiment, similarly to the first and second embodiments, a medical camera system 100C used when a medical action using a surgical microscope is performed will be described as an example. FIG. 11 is a block diagram showing a system configuration example of the medical camera system 100C according to the fourth embodiment. In the description of FIG. 11, the same components as those of the medical camera system 100 shown in FIG. 2 or the medical camera system 100B shown in FIG. 9 are denoted by the same reference numerals and the description thereof will be simplified or omitted, and different contents will be described.

The medical camera system 100C according to the fourth embodiment includes the visible light source device 31, the IR light source device 32, the camera head 21, CCUs 40LC, 40RC, the output unit 50 and the external control device 70. In the fourth embodiment, similarly to the third embodiment, the genlock master is one of the two CCUs 40LC, 40RC (for example, the CCU 40LC). In other words, in the fourth embodiment, the CCU 40LC serves as the genlock master that generates the genlock signal GLCK, and the CCU 40RC serves as a genlock slave that receives the genlock signal GLCK.

The CCU 40LC (an aspect of the first video processing device) inputs data of the imaged video imaged by the camera head 21L, performs various video processing on the data of the imaged video, and generates a left eye output video for forming a 3D video that can be viewed in a three-dimensional manner in the output unit 50. The CCU 40LC outputs data of the generated left eye output video to the output unit 50. The CCU 40LC includes the synchronization signal generation unit 41L, the light source control unit 42L, the camera control unit 43L, the genlock transmission unit 44L, the external control device I/F unit 46L and a synchronization auxiliary signal transmission unit 47L.

Upon receiving a synchronization signal initialization instruction signal INT1C via the external control device I/F unit 46L in a frame period (see FIG. 12), the synchronization signal generation unit 41L generates a synchronization auxiliary signal SUPL (see FIG. 12) for initializing a synchronization timing of imaging of the CCU 40RC (an aspect of the second video processing device) according to the synchronization signal initialization instruction signal INT1C together with the CCU 40LC and transmits the synchronization auxiliary signal SUPL to the CCU 40RC via the synchronization auxiliary signal transmission unit 47L within the next frame period. The synchronization signal generation unit 41L generates the genlock signal GLCK for aligning (that is, synchronizing) operation such as irradiation (lighting) of each of the visible light source device 31 and the IR light source device 32 and imaging of each of the camera heads 21L, 21R from the next frame period at a predetermined timing shown in FIG. 12 based on transmission of the synchronization auxiliary signal to the CCU 40RC. The synchronization signal initialization instruction signal INT1C is an instruction signal for initializing (resetting) synchronization of the operation such as the irradiation (the lighting) of each of the visible light source device 31 and the IR light source device 32 and the imaging of each of the camera heads 21L, 21R. This is because the synchronization of the operation such as the irradiation (the lighting) of each of the visible light source device 31 and the IR light source device 32 and the imaging of each of the camera heads 21L, 21R is likely to be lost due to aging or the like, and this lost synchronization is reset (initialized). As the genlock master, the synchronization signal generation unit 41L generates the genlock signal GLCK (described above) that is synchronized with the light source synchronization signals LS1, LS2, and transmits the genlock signal GLCK to the CCU 40RC via the genlock transmission unit 44L. When a frame rate of the imaged video is, for example, 60 fps, the signal component of the genlock signal GLCK is high every "1/15" seconds similarly to those of the light source synchronization signals LS1, LS2, and timings when signal components are high are also the same (see FIG. 12).

Figure 12:
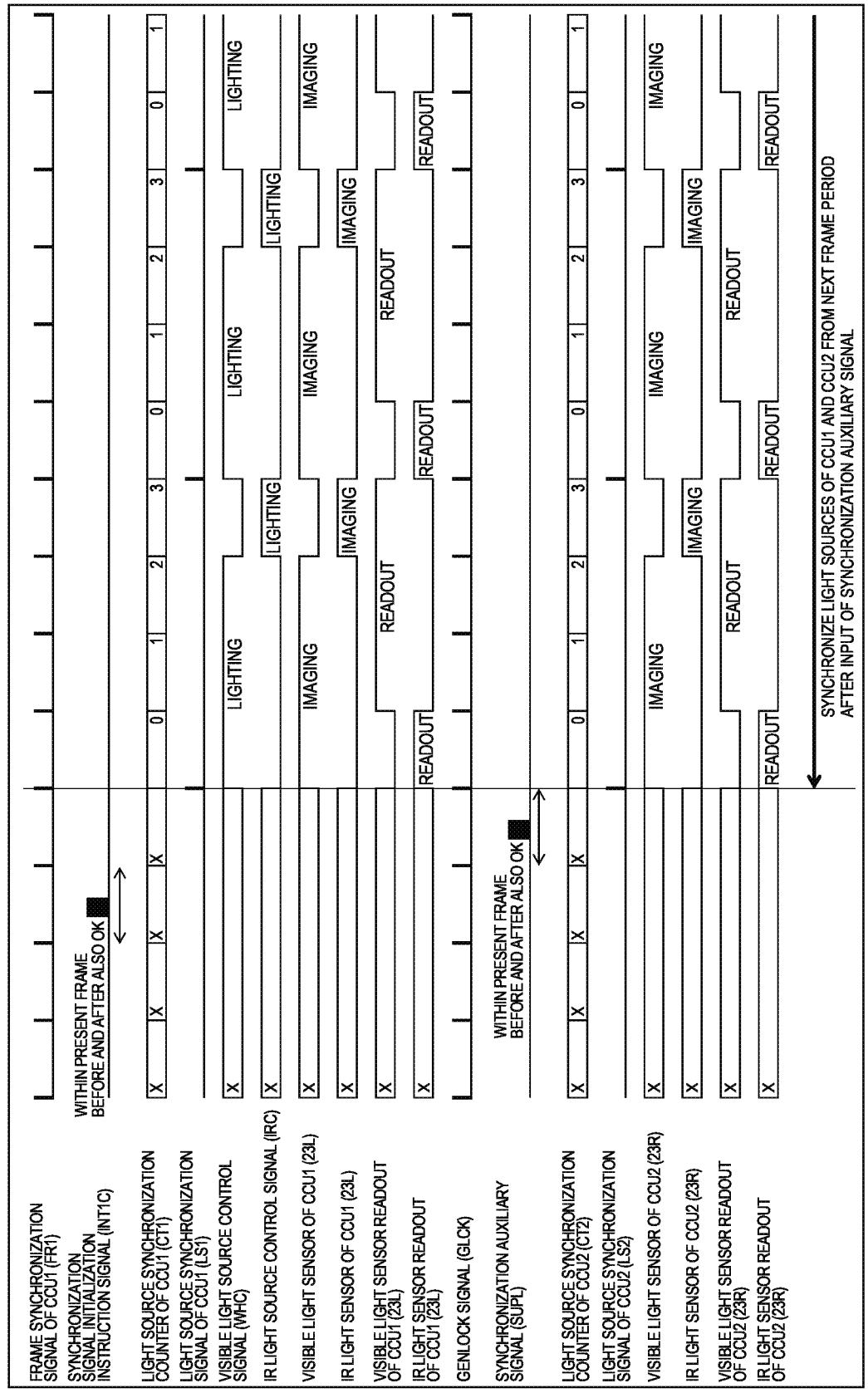
FIG. 12 is a timing chart showing an operation procedure regarding synchronization control on a visible light source device, an IR light source device and a camera head according to the fourth embodiment.

The synchronization signal generation unit 41L generates the frame synchronization signal FR1 of the imaged video imaged by the camera head 21L corresponding to the CCU 40LC based on the generated genlock signal GLCK. The synchronization signal generation unit 41L includes the light source synchronization counter CT1, and generates the light source synchronization signal LS1 for defining the start timing of the irradiation (the lighting) of each of the visible light source device 31 and the IR light source device 32, based on the genlock signal GLCK and a value of the light source synchronization counter CT1. If the light source synchronization counter CT1 is provided in the CCU 40LC, the synchronization signal generation unit 41L may not include the light source synchronization counter CT1. When the frame rate of the imaged video is, for example, 60 fps, the signal component of the frame synchronization signal FR1 is high every "1/60" seconds, and the signal component of the light source synchronization signal LS1 is high every "1/15" seconds as shown in FIG. 12. This is because the visible light source device 31 performs irradiation (lighting) for three times the frame period (for example, "1/60"×3), and then the IR light source device 32 performs irradiation (lighting) for the frame period (for example, "1/60"×1), and the visible light source device 31 and the IR light source device 32 are controlled to repeat based on those irradiation (lighting) patterns. The synchronization signal generation unit 41L transmits the frame synchronization signal FR1 to the camera control unit 43L, and transmits the light source synchronization signal LS1 to the light source control unit 42L. The synchronization signal generation unit 41L may transmit the frame synchronization signal FR1 and the light source synchronization signal LS1 to the light source control unit 42L and the camera control unit 43L respectively.

The light source control unit 42L controls a timing of irradiation (lighting) of the white light from the visible light source device 31 and a timing of irradiation (lighting) of the IR excitation light from the IR light source device 32. The light source control unit 42L generates the visible light source control signal WHC for causing the visible light source device 31 continuously perform the irradiation (the lighting) during a period (that is, a period three times the frame period) during which the value of the light source synchronization counter CT1 changes from "0" to "2" and generates the IR light source control signal IRC for causing the IR light source device 32 to perform the irradiation (the lighting) during a period (that is, a period of the frame period) during which the value of the light source synchronization counter CT1 changes from "2" to "3", in response to input of the light source synchronization signal LS1 transmitted from the synchronization signal generation unit 41L. Values of the light source synchronization counters CT1, CT2 change to "0", "1", "2", "3", and return to "0" after "3". That is, the values of the light source synchronization counters CT1, CT2 change such that a period (four times the frame period) of the light source synchronization signal LS1 is used as a reference repeatedly. The light source control unit 42L transmits the visible light source control signal WHC to the visible light source device 31, and transmits the IR light source control signal IRC to the IR light source device 32.

The external control device I/F unit 46L includes a communication circuit capable of transmitting and receiving signals related to the synchronization signal initialization instruction signal INT1C to and from the external control device 70. Upon receiving the synchronization signal initialization instruction signal INT1C transmitted from the external control device 70, the external control device I/F unit 46L transfers the received signal to the synchronization signal generation unit 41L.

The synchronization auxiliary signal transmission unit 47L includes a communication circuit capable of transmitting and receiving the synchronization auxiliary signal SUPL described above to and from the CCU 40RC serving as the genlock slave. The synchronization auxiliary signal transmission unit 47L transmits the synchronization auxiliary signal SUPL generated by the synchronization signal generation unit 41L to a synchronization auxiliary signal reception unit 47R of the CCU 40RC.

The CCU 40RC (an aspect of the second video processing device) inputs data of the imaged video imaged by the camera head 21R, performs various video processing on the data of the imaged video, and generates a right eye output video for forming a 3D video can be viewed in a three-dimensional manner in the output unit 50. The CCU 40RC outputs data of the generated right eye output video to the output unit 50. The CCU 40RC includes the synchronization signal generation unit 41R, the camera control unit 43R, the genlock reception unit 45R and the synchronization auxiliary signal reception unit 47R.

Upon receiving the synchronization auxiliary signal SUPL via the synchronization auxiliary signal reception unit 47R in the frame period (see FIG. 12), the synchronization signal generation unit 41R receives the genlock signal GLCK transmitted from the CCU 40LC serving as the genlock master at a start of the next frame period after the frame period of reception. The synchronization auxiliary signal SUPL is a signal that causes the camera head 21L to synchronize with the camera head 21R to initialize the synchronization timing of imaging in accordance with the synchronization signal initialization instruction signal INT1C, and can also be referred to as a signal that informs reception of the synchronization signal initialization instruction signal INT1C from the external control device 70. As the synchronization auxiliary signal SUPL, for example, a pulse signal or a serial signal (such as a RS-232C) can be used.

The synchronization signal generation unit 41R generates the frame synchronization signal FR2 of the imaged video imaged by the camera head 21R corresponding to the CCU 40RC based on the genlock signal GLCK. The synchronization signal generation unit 41R includes the light source synchronization counter CT2, and generates the light source synchronization signal LS2 for defining the start timing of the irradiation (the lighting) of each of the visible light source device 31 and the IR light source device 32, based on the genlock signal GLCK and the value of the light source synchronization counter CT2. If the light source synchronization counter CT2 is provided in the CCU 40RB, the synchronization signal generation unit 41R may not include the light source synchronization counter CT2. When the frame rate of the imaged video is, for example, 60 fps, the signal component of the frame synchronization signal FR2 is high every "1/60" seconds, and the signal component of the light source synchronization signal LS2 is high every "1/15" seconds as shown in FIG. 12. This is because the visible light source device 31 performs irradiation (lighting) for three times the frame period (for example, "1/60"×3), and then the IR light source device 32 performs irradiation (lighting) for the frame period (for example, "1/60"×1), and the visible light source device 31 and the IR light source device 32 are controlled to repeat those irradiation (lighting) patterns. The synchronization signal generation unit 41R transmits the frame synchronization signal FR2 to the camera control unit 43R.

The synchronization auxiliary signal reception unit 47R includes a communication circuit capable of transmitting and receiving the synchronization auxiliary signal SUPL to and from the CCU 40LC serving as the genlock master. Upon receiving the synchronization auxiliary signal SUPL transmitted from the CCU 40LC, the synchronization auxiliary signal reception unit 47R transfers the received signal to the synchronization signal generation unit 41R.

The external control device 70 (an aspect of the second external device) is formed by an information processing device (that is, a computer) such as a personal computer (PC), generates the synchronization signal initialization instruction signal INT1C, and transmits the generated signal to the CCU 40LC.

Next, operation timings of the visible light source device 31, the IR light source device 32 and the camera head 21 according to the fourth embodiment will be described with reference to FIG. 12. FIG. 12 is a timing chart showing an operation procedure regarding synchronization control on the visible light source device 31, the IR light source device 32 and the camera head 21 according to the fourth embodiment. In FIG. 12, the same reference numerals are given to the same contents as the operation timings of the units in FIG. 10 and the description thereof will be simplified or omitted, and different contents will be described.

In FIG. 12, for example, the synchronization of the operation such as the irradiation (the lighting) of each of the visible light source device 31 and IR light source device 32 and the imaging of each of the camera heads 21L, 21R is lost until the synchronization signal initialization instruction signal INT1C is input to the CCU 40LC from the external control device 70 within a third frame period. For example, the synchronization signal initialization instruction signal INT1C is input from the external control device 70 to the CCU 40LC at any timing within the third frame period. In this case, the CCU 40LC serving as the genlock master generates the synchronization auxiliary signal SUPL based on the reception of the synchronization signal initialization instruction signal INT1C, and transmits the synchronization auxiliary signal SUPL such that the CCU 40RC can receive the transmitted signal within the next fourth frame period. The CCU 40LC generates the genlock signal GLCK for aligning (that is, synchronizing) the operation such as the irradiation (the lighting) of each of the visible light source device 31 and the IR light source device 32 and the imaging of each of the camera heads 21L, 21R at the predetermined timing shown in FIG. 12 based on transmission of the synchronization auxiliary signal SUPL, and transmits the genlock signal GLCK to the CCU 40RC at a start of a fifth frame period. The CCU 40RC receives the synchronization auxiliary signal SUPL transmitted from the CCU 40LC within the fourth frame period, and aligns the operation at the predetermined timing shown in FIG. 12 based on the genlock signal GLCK received at the start of the fifth frame period. Since the operation after the fifth frame period is the same as that of the third embodiment (the operation after the fifth frame period shown in FIG. 10), the description thereof will be omitted.

As described above, in the medical camera system 100C according to the fourth embodiment, the CCU 40LC receives the synchronization signal initialization instruction signal INT1C (an aspect of the initialization signal) for initializing the synchronization timing of the lighting of each of the visible light source device 31 and the IR light source device 32 and the imaging of each of the camera heads 21L, 21R from the external control device 70 within the frame period of the imaged video. The CCU 40LC transmits the synchronization auxiliary signal SUPL for initializing the synchronization timing of the imaging of the camera head 21R according to the synchronization signal initialization instruction signal INT1C to the CCU 40RC based on the reception of the synchronization signal initialization instruction signal INT1C. Thereby, even when the synchronization of the operation such as the irradiation (the lighting) of each of the visible light source device 31 and IR light source device 32 and the imaging of each of the camera heads 21L, 21R are lost due to aging or the like, the medical camera system 100C can perform synchronization by initializing the synchronization timing of the lighting of each of the visible light source device 31 and the IR light source device 32 and the imaging of each of the camera heads 21L, 21R based on reception of the synchronization signal initialization instruction signal INT1C and the synchronization auxiliary signal SUPL.

The CCU 40LC generates the genlock signal GLCK having a period the same as those of the light source synchronization signals LS1, LS2 for instructing the lighting of each of the visible light source device 31 and the IR light source device 32, so as to be synchronized with, for example, four times the frame period of the imaged video, and transmits the genlock signal GLCK to the CCU 40RB, based on the transmission of the synchronization auxiliary signal SUPL. The CCU 40LC controls the lighting of each of the visible light source device 31 and the IR light source device 32 and the imaging of the corresponding camera head 21L based on the genlock signal GLCK. The CCU 40RC controls the operation such as the imaging of the camera head 21R so as to synchronize with the operation such as the lighting of each of the visible light source device 31 and the IR light source device 32 and the imaging of the corresponding camera head 21L, for example, every four times the frame period, based on the genlock signal GLCK. Thereby, even when the synchronization of the operation such as the irradiation (the lighting) of each of the visible light source device 31 and the IR light source device and the imaging of each of the camera heads 21L, 21R is lost due to aging or the like, the imaged video (for example, a visible video or a fluorescent video) of the subject SUB is appropriately obtained from the camera head 21L in accordance with the lighting of each of the visible light source device 31 and the IR light source device 32 since the lighting of each of the visible light source device 31 and the IR light source device 32 and the imaging of the corresponding camera head 21L are synchronized.

Although the embodiments have been described above with reference to the drawings, it is needless to say that the present disclosure is not limited to such examples. It will be apparent to those skilled in the art that various alterations, modifications, substitutions, additions, deletions, and equivalents can be conceived within the scope of the claims, and it should be understood that they also belong to the technical scope of the present disclosure. Each component in various embodiments described above may be combined optionally in the range without deviating from the spirit of the disclosure.

Figure 13:
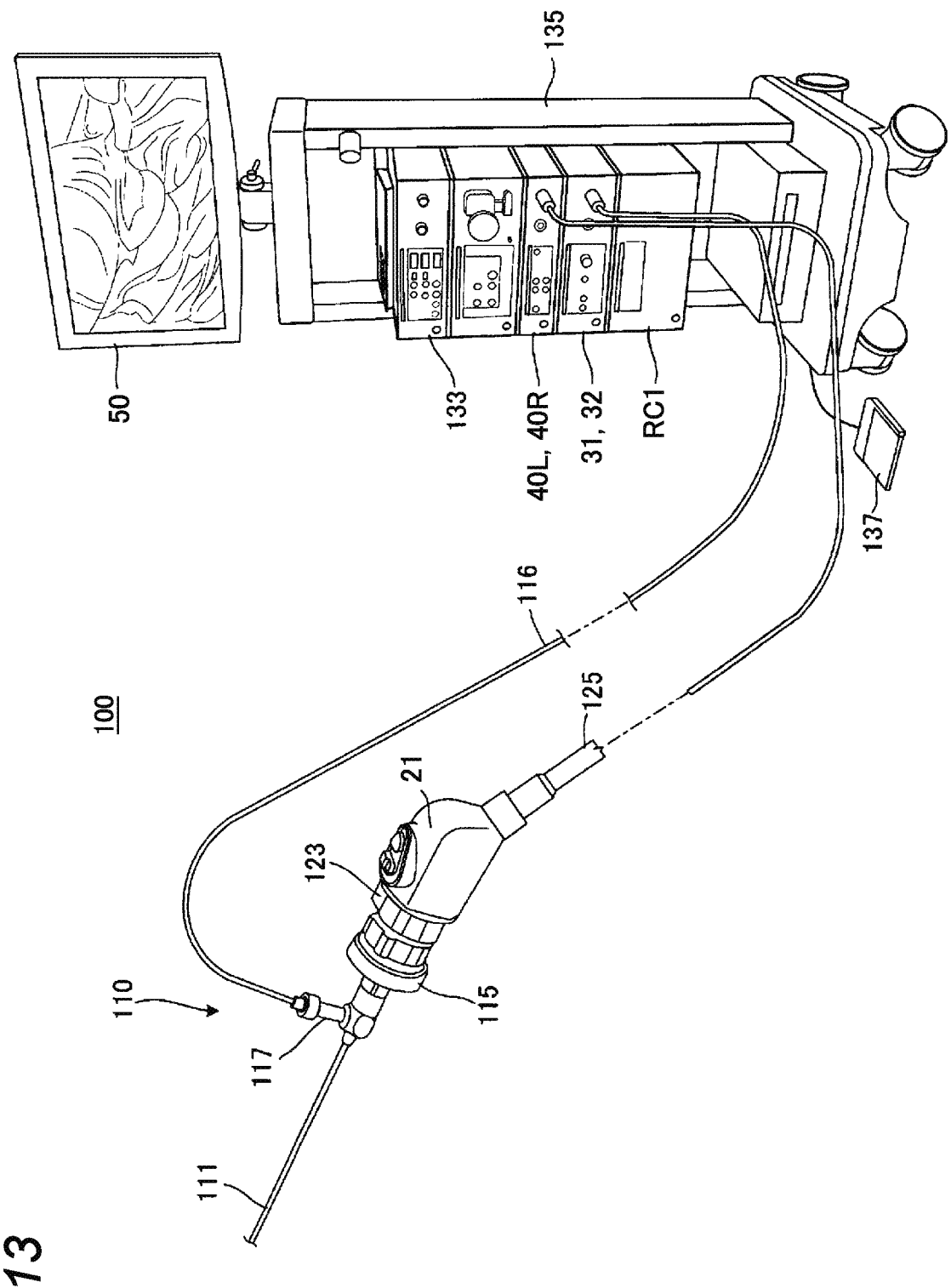
FIG. 13 is a view showing an external appearance example of a medical camera system in which a surgical endoscope is used.

Although the medical camera system according to the various embodiments described above has been described as being used when a medical action using a surgical microscope is performed, the medical camera system is not limited to this application, and may be used, for example, when a medical action using a surgical endoscope is performed (see FIG. 13). FIG. 13 is a view showing an appearance example of a medical camera system in which a surgical endoscope is used.

The medical camera system in FIG. 13 includes a surgical endoscope 110 as an example of the medical optical instrument, the visible light source device 31, the IR light source device 32, the camera head 21 as an example of the imaging device, the CCUs 40L, 40R as examples of the video processing device, and the output unit 50.

The surgical endoscope 110 includes an objective lens (not shown), a relay lens and an imaging lens in an elongated insertion portion 111. The surgical endoscope 110 includes a camera mounting portion 115 provided at a hand side of an observation optical system, and a light source mounting portion 117, and is provided with a light guide (not shown) that guides illumination light from the light source mounting portion 117 to a tip end portion of the insertion portion 111. By mounting the imaging optical systems 22L, 22R of the camera head 21 (specifically, the camera heads 21L, 21R) on the camera mounting portion 115 to perform imaging, observation images can be obtained in the CCUs 40L, 40R. A light guide cable 116 is connected to the light source mounting portion 117, and the visible light source device 31 and the IR light source device 32 are connected to the light source mounting portion 117 via the light guide cable 116.

The camera head 21 and the CCUs 40L, 40R are connected by a signal cable 125, and a video signal of the subject SUB imaged by the camera head 21 is transmitted to each of the CCUs 40L, 40R via the signal cable 125. The output unit 50 is connected to output terminals of the CCUs 40L, 40R, whereby both left eye output video and right eye output video for 3D display may be output, or a 2D observation video (an observation image) may be output. The output unit 50 may display a 3D video having 2K pixels or output the 2D observation video (the observation image) as the observation image of a surgical target site. The camera head 21 is provided with an operation switch (not shown) so that an operation (freezing, releasing, image scanning or the like) of the observation video to be imaged can be performed at hand of a user. The medical camera system shown in FIG. 13 includes a recorder RC1 that records the observation video imaged by the CCUs 40L, 40R, an operation unit 133 for operating the medical camera system, and a foot switch 137 that performs operation input using a foot of an observer. The operation unit 133, the CCUs 40L, 40R, the visible light source device 31, the IR light source device 32 and the recorder RC1 are housed in a control unit box body 135. The output unit 50 is arranged above the control unit box body 135.

In this way, similarly to configurations of the above-described medical camera systems 100, 100A, 100B using the surgical microscope, even in a configuration of the medical camera system using the surgical endoscope as shown in FIG. 13, it is possible to output a superimposed video in which a state of an observation target site obtained by the surgical endoscope 110 can be clearly confirmed.

The present disclosure is useful as an imaging system and a synchronization control method that enable a plurality of light source devices and a plurality of imaging devices to operate in synchronization with each other at a predetermined timing and support output of a three-dimensional video having good image quality during a medical action such as a microscopic surgery or an endoscopic surgery.

This application is based on Japanese Patent Application (No. 2019-017851) filed on Feb. 4, 2019, the contents of which are incorporated herein by reference.

What is claimed is:

1. An imaging system comprising:
a first light source which emits visible light to irradiate a subject; and
a second light source which emits excitation light in an infrared region and which causes a fluorescent substance administered to the subject to emit fluorescence;
first and second imaging devices configured to image the subject;
first and second video processors provided corresponding to the first and second imaging devices, and configured to process an imaged video of the subject imaged by either of the corresponding imaging devices and to output the processed video to an output unit; and
a single genlock transmitter which is provided in the first video processor and configured to generate and transmit a genlock signal to a single genlock receiver which is provided in the second video processor,
wherein the first video processor controls the lighting of each of the first and second light the first and second light sources such that they alternately perform lighting in synchronization with a frame period of the imaged video or an integer multiple of the frame period of the imaged video based on the genlock signal;
wherein the first video processor controls imaging of either of the corresponding imaging devices based on the genlock signal;
wherein the first imaging device performs imaging in synchronization with the lighting of each of the first and second light sources; and
wherein the second imaging device performs imaging in synchronization with the lighting of each of the first and second light sources.

2. The imaging system according to claim 1,
wherein the first video processor generates the genlock signal having a period the same as that of a light source synchronization signal that instructs the lighting of each of the first and second light sources so as to be synchronized with the frame period of the imaged video, and transmits the generated genlock signal to the second video processor.

3. The imaging system according to claim 1,
wherein the first and second devices processors simultaneously receive the genlock signal having a period the same as that of a light source synchronization signal that instructs the lighting of each of the first and second light sources from an external device.

4. The imaging system according to claim 3,
wherein the first video processor controls the lighting of each of the first and second light sources and the imaging of either of the corresponding imaging devices based on the received genlock signal; and
wherein the second video processor controls the imaging of either of the corresponding imaging devices based on the received genlock signal.

5. The imaging system according to claim 1,
wherein the first and second devices processors receive an initialization signal for initializing a synchronization timing of the lighting of each of the first and second light sources and imaging of each of the first and second imaging devices within the frame period of the imaged video from an external device.

6. The imaging system according to claim 5,
wherein the first video processor, based on reception of the initialization signal,
generates the genlock signal having a period the same as that of a light source synchronization signal that instructs the lighting of each of the first and second light sources so as to be synchronized with the frame period of the imaged video, and transmits the generated genlock signal to the second video processor, and
controls the lighting of each of the first and second light sources and the imaging of either of the corresponding imaging devices based on the genlock signal.

7. The imaging system according to claim 1,
wherein the first video processor receives an initialization signal for initializing a synchronization timing of the lighting of each of the first and second light sources and the imaging of each of the first and second imaging devices within the frame period of the imaged video from an external device, and transmits a synchronization auxiliary signal for initializing the synchronization timing of the imaging of the second imaging device according to the initialization signal to the second video processor based on reception of the initialization signal.

8. The imaging system according to claim 7,
wherein the first video processor, based on transmission of the synchronization auxiliary signal,
generates the genlock signal having a period the same as that of a light source synchronization signal that instructs the lighting of each of the first and second light sources so as to be synchronized with the frame period of the imaged video, and transmits the generated genlock signal to the second video processor, and
controls the lighting of each of the first and second light sources and the imaging of either of the corresponding imaging devices based on the genlock signal.

9. The imaging system according to claim 1,
wherein the first video processor outputs a left eye imaged video generated based on the processing to the output unit; and
wherein the second video processor outputs a right eye imaged video generated based on the processing to the output unit.

10. A synchronization control method in an imaging system, the imaging system including:
a first light source which emits visible light to irradiate a subject; and
a second light source which emits excitation light in an infrared region and which causes a fluorescent substance administered to the subject to emit fluorescence;
first and second imaging devices configured to image the subject; and
first and second devices processors provided corresponding to the first and second imaging devices, and configured to process an imaged video of the subject imaged by either of the corresponding imaging devices and to output the processed video to an output unit,
the synchronization control method comprising:
generating and transmitting a genlock signal via a single genlock transmitter which is provided in the first video processor;
receiving, from the single genlock transmitter, the genlock signal via a single genlock receiver which is provided in the second video processor;
controlling, via the first video processor:
the lighting of each of the first and second light sources such that they alternately perform lighting in synchronization with a frame period of the imaged video or an integer multiple of the frame period of the image video based on the genlock signal; and
imaging of either of the corresponding imaging devices based on the genlock signal;
performing imaging in synchronization with the lighting of each of the first and second light source devices by the first imaging device; and
performing imaging in synchronization with the lighting of each of the first and second light source devices by the second imaging device.

* * * * *